United States Patent
Apostolos et al.

(10) Patent No.: US 10,121,049 B2
(45) Date of Patent: *Nov. 6, 2018

(54) FINGERPRINT BASED SMART PHONE USER VERIFICATION

(71) Applicant: AMI Research & Development, LLC, Windham, NH (US)

(72) Inventors: John T. Apostolos, Lyndeborough, NH (US); William Mouyos, Windham, NH (US); Judy Feng, Nashua, NH (US); Dwayne T. Jeffrey, Amherst, NH (US); Lillian Dobrowolski, Merrimack, NH (US)

(73) Assignee: AMI Research & Development, LLC, Windham, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/429,578

(22) Filed: Feb. 10, 2017

(65) Prior Publication Data

US 2017/0220843 A1 Aug. 3, 2017

Related U.S. Application Data

(63) Continuation-in-part of application No. 15/226,153, filed on Aug. 2, 2016, now Pat. No. 9,754,149, which
(Continued)

(51) Int. Cl.
*G06K 9/00* (2006.01)
*H04M 1/673* (2006.01)
(Continued)

(52) U.S. Cl.
CPC ......... *G06K 9/00026* (2013.01); *G06F 3/044* (2013.01); *G06F 3/0488* (2013.01);
(Continued)

(58) Field of Classification Search
CPC .............. G06K 9/00067; G06K 9/001; G06K 9/00026; G06K 9/0002; G06K 9/0008;
(Continued)

(56) References Cited

U.S. PATENT DOCUMENTS 6,370,264 B1 4/2002 Leavitt
6,766,040 B1 7/2004 Catalano et al.
(Continued)

FOREIGN PATENT DOCUMENTS

WO WO 2013/055953 A1 4/2013
WO WO 2013/093638 6/2013

OTHER PUBLICATIONS

International Search Report and Written Opinion dated Jun. 7, 2017 for International Application No. PCT/US1717316 filed Feb. 10, 2017 by AMI Research & Development, LLC, 15 pages.
(Continued)

*Primary Examiner* — Ali Bayat
(74) *Attorney, Agent, or Firm* — VLP Law Group, LLP

(57) ABSTRACT

A touchscreen, now incorporated in most smartphones, tablets, laptops, and similar devices, presents an effective and transparent method to incorporate continuous active user verification schemes. The touchscreen element grid structure can be used to capture information, such as a set of one-dimensional time-varying signals produced as the user's finger moves past the grid intersections points. This information may be used to verify the user, or that a valid user currently has possession of the mobile device, even while the user is not consciously engaged in an active verification process. Further functions, such as habitual gesture recognition, can also be performed using the same grid outputs.

20 Claims, 23 Drawing Sheets

Related U.S. Application Data is a continuation-in-part of application No. 14/231,935, filed on Apr. 1, 2014, now Pat. No. 9,432,366.

(60) Provisional application No. 62/293,924, filed on Feb. 11, 2016, provisional application No. 61/807,113, filed on Apr. 1, 2013.

(51) Int. Cl.

| | |
|---|---|
| G06F 3/044 | (2006.01) |
| G06F 21/32 | (2013.01) |
| G06F 3/0488 | (2013.01) |
| G06K 9/22 | (2006.01) |
| H04L 29/06 | (2006.01) |
| H04W 12/06 | (2009.01) |
| H04W 88/02 | (2009.01) |

(52) U.S. Cl.
CPC ............ *G06F 21/32* (2013.01); *G06K 9/001* (2013.01); *G06K 9/0002* (2013.01); *G06K 9/0008* (2013.01); *G06K 9/00355* (2013.01); *G06K 9/00892* (2013.01); *G06K 9/22* (2013.01); *H04L 63/0861* (2013.01); *H04M 1/673* (2013.01); *H04W 12/06* (2013.01); *G06F 2203/0338* (2013.01); *G06F 2221/2139* (2013.01); *H04M 2250/22* (2013.01); *H04W 88/02* (2013.01); *H05K 999/99* (2013.01)

(58) Field of Classification Search
CPC ............... G06K 9/00013; G06F 3/044; G06F 3/04883; G06F 21/32
See application file for complete search history.

(56) References Cited

U.S. PATENT DOCUMENTS

| | | | | |
|---|---|---|---|---|
| 7,072,523 | B2 * | 7/2006 | Bolle | ............... G06K 9/00067 |
| | | | | 382/124 |
| 8,086,417 | B2 | 12/2011 | Seguine | |
| 8,566,955 | B2 | 10/2013 | Brosnan | |
| 8,627,096 | B2 | 1/2014 | Azar et al. | |
| 2002/0146178 | A1 | 10/2002 | Bolle | |
| 2005/0041885 | A1 | 2/2005 | Russo | |
| 2005/0123177 | A1 | 6/2005 | Abiko | |
| 2007/0274575 | A1 | 11/2007 | Russo | |
| 2008/0091453 | A1 | 4/2008 | Meehan | |
| 2008/0092245 | A1 | 4/2008 | Alward | |
| 2008/0098456 | A1 | 4/2008 | Alward | |
| 2009/0009194 | A1 | 1/2009 | Seguine | |
| 2009/0083847 | A1 | 3/2009 | Fadell | |
| 2010/0150411 | A1 | 6/2010 | Bauchspies et al. | |
| 2010/0225443 | A1 | 9/2010 | Bayram | |
| 2011/0050394 | A1 | 3/2011 | Zhang | |
| 2012/0182253 | A1 | 7/2012 | Brosnan | |
| 2012/0242635 | A1 * | 9/2012 | Erhart | ................... G06F 1/1626 |
| | | | | 345/207 |
| 2013/0104203 | A1 | 4/2013 | Davis et al. | |
| 2013/0159939 | A1 | 6/2013 | Krishnamurthi | |
| 2013/0307818 | A1 | 11/2013 | Pope | |
| 2014/0003679 | A1 | 1/2014 | Han | |
| 2014/0066017 | A1 | 3/2014 | Cho | |
| 2014/0219521 | A1 | 8/2014 | Schmitt | |
| 2014/0310804 | A1 | 10/2014 | Apostolos et al. | |
| 2014/0369572 | A1 * | 12/2014 | Setlak | ................ G06K 9/00013 |
| | | | | 382/124 |
| 2017/0039409 | A1 * | 2/2017 | Han | ................... G06K 9/00926 |
| 2017/0169277 | A1 * | 6/2017 | Benkley, III | ........ G06K 9/00026 |
| 2017/0308228 | A1 * | 10/2017 | Benkley, III | .......... H01L 27/323 |

OTHER PUBLICATIONS

Meng et al., "Touch Gestures Based Biometric Authentication Scheme for Touchscreen Mobile Phones," Information Security and Cryptology, Lecture Notes in Computer Science vol. 7763, 2013, pp. 331-350.

Trewin et al., "Biometric Authentication on a Mobile Device: A Study of User Effort, Error and Task Disruption," *ACSAC'12*, Dec. 3-7, 2012, Orlando, FL, 10 pages.

Merriam-Webster's Collegiate Dictionary, Tenth Edition, p. 437 see definition of "fingerprint", copyright 1999 Merriam-Webster, Incorporated, Springfield, Massachusetts, USA.

Meng et al., "Touch Gestures Based Biometric Authentication Scheme for Touchscreen Mobile Phones," (Information Security and Cryptology, Nov. 2012, pp. 331-350).

Frank et al., Touchanalytics: On the Applicability of Touchscreen Input as a Behavioral Biometric for Continuous Authentication (IEEE Transactions on Information Forensics and Security, vol. 8, No. 1, Jan. 2013).

* cited by examiner

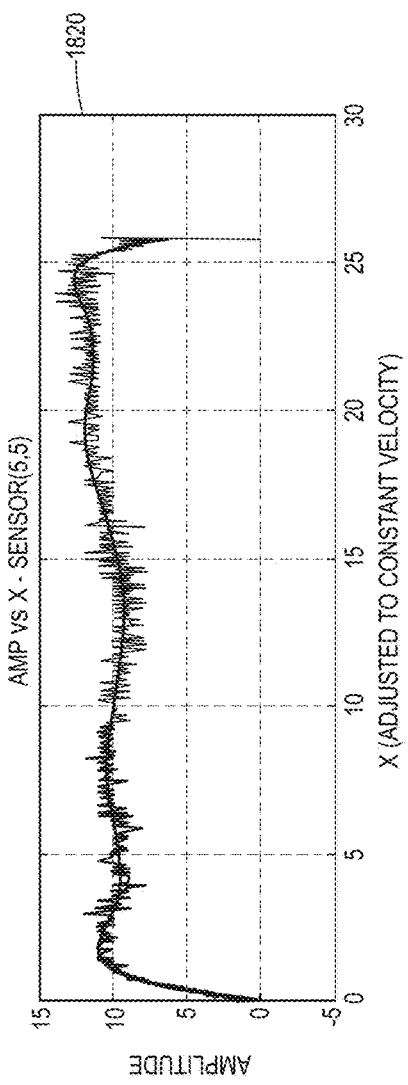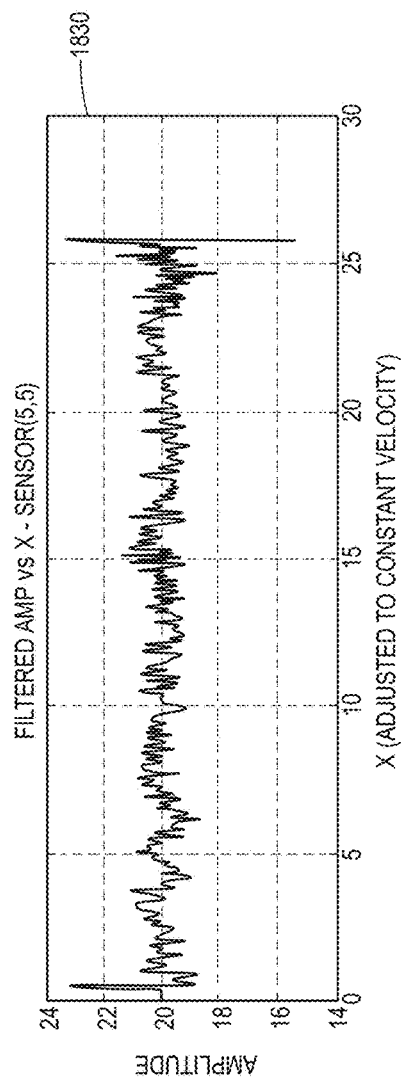

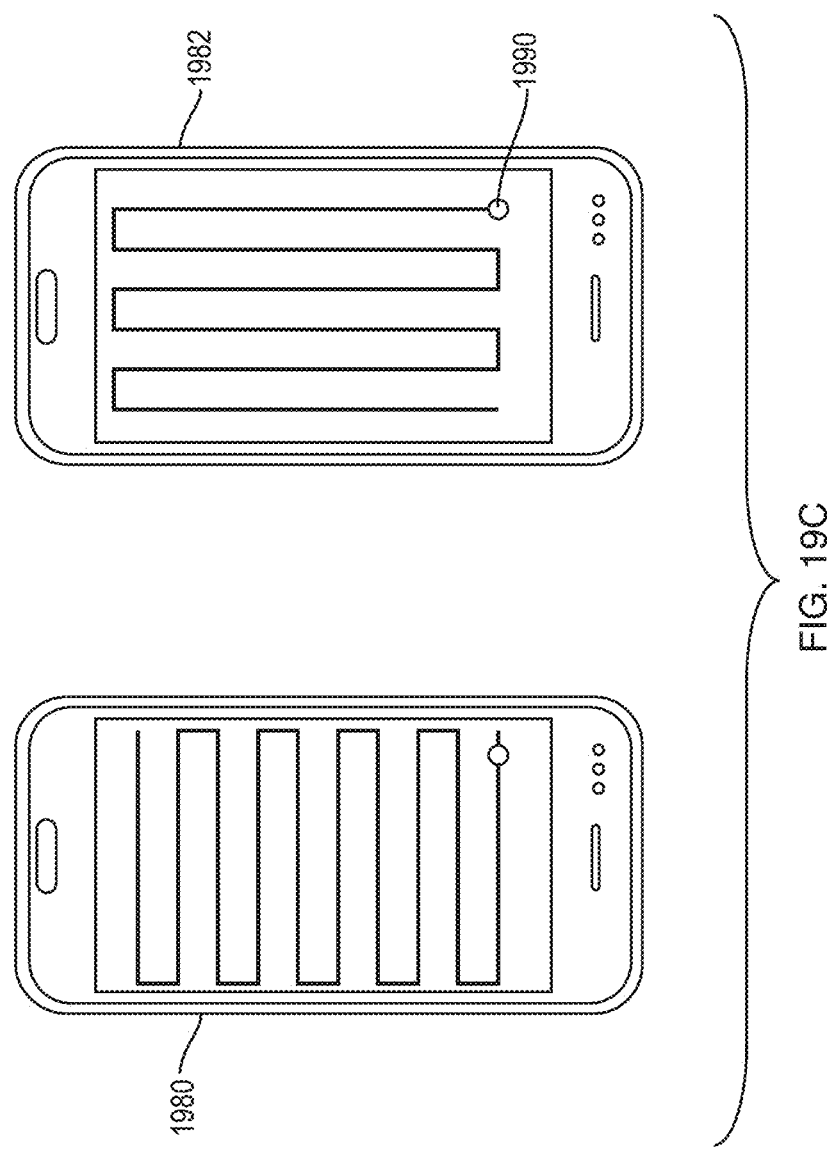

FINGERPRINT BASED SMART PHONE USER VERIFICATION

CROSS REFERENCE TO RELATED APPLICATIONS

This application claims the benefit of a U.S. Provisional Patent Application Ser. No. 62/293,924 filed Feb. 11, 2016 entitled "Fingerprint Based User Verification Using Self Registration of the Valid User" and is a continuation in part of co-pending U.S. patent application Ser. No. 15/226,153 filed Aug. 2, 2016 entitled "Fingerprint Based Smart Phone User Verification" which is a continuation in part of co-pending U.S. patent application Ser. No. 14/231,935 filed Apr. 1, 2014 entitled "Fingerprint Based Smartphone User Verification", which in turn claims the benefit of U.S. Provisional Patent Application Ser. No. 61/807,113 filed Apr. 1, 2013 entitled "Fingerprint Based Smart Phone User Verification". The entire contents of each of the above-referenced patent applications are hereby incorporated by reference.

BACKGROUND

Technical Field

This application relates in general to providing security in mobile electronic devices and in particular to techniques that verify authorized users via touch sensors.

Background Information

For some time it has been common to provide mobile devices such as smartphones, tablet computers, laptop computers and the like with various mechanisms to provide lock-unlock functions. These functions help limit use of the device, to prevent unwanted persons from gaining access. In general a mobile device will perform a lock function when a lock activation mode has been selected by an authorized user. In addition to activation at power on, a mobile device will typically also activate the lock function when there is no input from a user for a period of time.

Commonly known factors for controlling lock-unlock are the entry of passwords via a keyboard, finger swipe motions or drawing gestures on a touchscreen, sensors to detect fingerprints, facial recognition via built-in cameras, and others. It is also known to provide further security by combining two or more such factors before granting access to the device.

SUMMARY

Although there are several existing applications for mobile phones and other devices that can verify a user in order to unlock a phone, entry passwords, facial images, fingerprint "touch ID," swipe motions or even drawing sequences are a one time entry and do not continually verify the user. This is adequate for some applications, but not necessarily for others, such as a military use, where a device already in use could be taken from a soldier by an enemy.

Periodic user verification may be implemented with the same modality as the unlock feature, but at the expense of user productivity. The tradeoff between longer intervals for productivity and shorter intervals for security has no realistic optimum value. Given that these devices are typically used for computing and data communication, and not necessarily voice communication, background voice authentication is not a good omnipresent modality for this assessment. Also, since low power usage is important for field operations, periodic or background image capture for facial image authentication expends a mobile device's battery prematurely. There are also context and environmental variables such as lighting and uniform or gear changes that affect performance.

According to the teachings herein, an active authentication method and system may be based on biometric authentication modalities—"user touchscreen gestures", which are a biometric behavioral signature in one embodiment, and/or a "fingerprint information", which is physiological data. The same touchscreen sensor data is used for both biometric modalities. These touchscreen sensors are already present in most smartphones, and therefore implementation does not necessarily require retrofitting additional hardware or new types of sensors.

The touchscreen, typically implemented as a grid of projected capacitive electrodes, presents an especially effective and transparent method to incorporate active user verification. The preferred solutions work actively as a background process, while the individual interacts and performs their normal work functions with the device. The projected capacitive grid structure can be used to capture enough information to continuously verify that a valid user has possession of the smartphone. As such, there is no need for the user to be actively prompted for authentication data; the user's natural finger motion itself is used instead.

Touch screens use projected capacitive grid structures where every electrode intersection can be unambiguously identified as a touch point. As the user's finger slides up and down the grid, the ridges and valleys of the finger move across these touch points, superimposing a one dimensional (1-D), time-varying profile of the finger "terrain" on the low frequency mutual capacitance effect of the intersecting wires. In one example, there may be four different 1-D time varying signals simultaneously extracted from the four touch points overlaying the fingerprint.

A user's fingerprints are stored during initialization of the device and then correlated with the 1-D time varying profiles for authentication.

Parameters, such as spatial and temporal coupling intervals, can vary considerably between devices. In certain embodiments, these should be about approximately 5 mm and 20 to 200 Hz, respectively. Taking into account the variable speed and location of finger movement by an individual over the touch screen provides an increased spatial and temporal sampling resolution. Therefore, adequate data for both the kinematic touch stylometry and finger image can be used as a biometric modality for active user authentication.

In some embodiments, the initial authentication or unlock mechanism for the device may be any of the aforementioned factors (passwords, gestures, facial recognition, etc.). The focus here is to instead provide subsequent, active, continuous authentication based on these authentication modalities.

Optional aspects of the method and system can be based on previously proven algorithms such as pattern recognition algorithm(s). They can be optionally integrated at a higher level with known Neuromorphic Parallel Processing techniques that have functionality similar to that of the biological neuron, for a multimodal fusion algorithm. For example, 1-D finger profiles may be combined with the outputs from other mobile device sensors such as audio (voice), image, or even user kinematic position stylometry (how the user typically holds the device). This provides additional modalities for authentication without increasing mobile device processing overhead as well as minimizing power consumption. These techniques can be wholly or partially implemented in remote servers accessible via wireless network(s), or in local special purpose neuromorphic procedures.

Given the proven robustness of the algorithms, the approach works with a range of spatial sampling resolution of current pro-cap touchscreen devices and the associated temporal sampling rate of the associated processor(s) that perform the algorithms.

BRIEF DESCRIPTION OF THE DRAWINGS

The description below refers to the accompanying drawings, of which:

FIGS. 18A to 18C show selection of sensors along the swipe path for finger image matching.

FIGS. 19A to 19C illustrate a self-enrollment and verification process where the device prompts the user through a controlled suite of interactions.

DETAILED DESCRIPTION OF PREFERRED EMBODIMENTS

A. Introduction

Described below are a system and method for using a touch screen, already present in most mobile devices, to provide active, continuous user authentication. The touch screen inputs provided as a user goes about normal interaction with the device provide sufficient interaction to verify that a valid user has possession of the device. The same physiological data can be combined with habitual gestures detected using the same touchscreen sensors to further authenticate the user.

B. Typical Device Architecture

Figure 1:
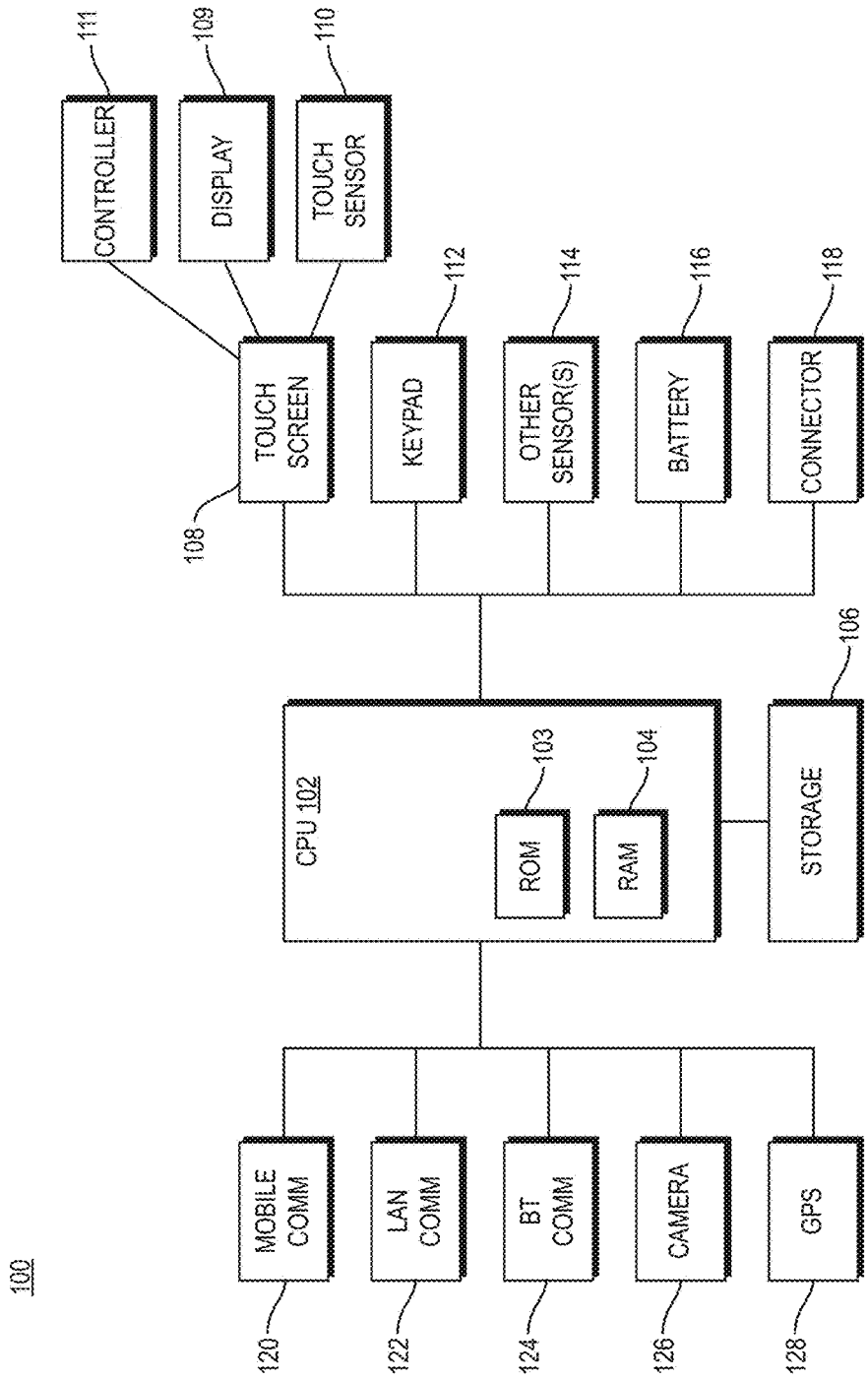
FIG. 1 is a block level diagram of the components of a typical smart phone.

FIG. 1 is a high-level block diagram of a typical device in which the methods and systems described herein may be implemented in whole or in part. Those of skill in the art will recognize the block diagram as illustrating example components of a typical smartphone, tablet, laptop computer device 100, or the like. The device 100 includes a central processing unit (CPU) 102 which may be a integrated circuit microprocessor or microcontroller. CPU 102 includes a read-only memory 103 and random access memory 104. The CPU 102 also has access to other storage 106. The CPU executes stored software programs in order to carry out the methods and to provide the system described herein.

Also part of the example device 100 are a touchscreen 108 which itself further includes a display portion 109, a touch sensor portion 110 and touchscreen controller 111. Additional components of the device 100 may include a keypad 112, other sensors such as accelerometers 114, a battery 116, and a connector 118. Additional functions and features may include a mobile network communication interface 120, a local area network communication interface 122, Bluetooth communication module 124, camera 126, Global Positioning System sensor 128 as well as other functions and features not shown in FIG. 1. What is important to the present discussion is that the device 100 includes CPU 102 and some sort of touchscreen 108 which can provide output signals to the CPU as described herein. The signals provided by the touchscreen 108 are processed according to the techniques described herein to provide additional security to the device 100 such as by granting or denying access to a user. The techniques described herein may be implemented in low-level device drivers, and/or the kernel of an operating system of the CPU 102, but may also be implemented at other hierarchical software levels.

Figure 2:
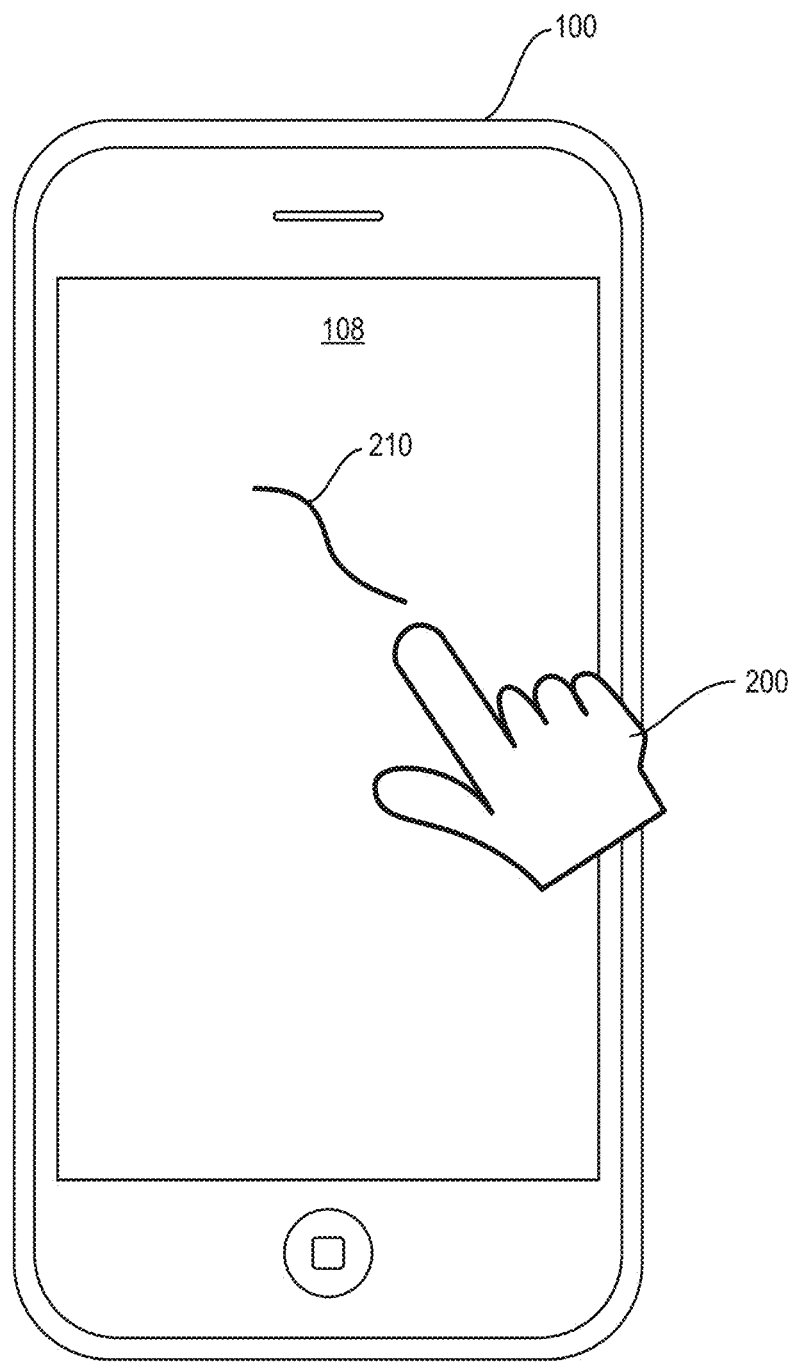
FIG. 2 is a view of a typical touch sensitive screen.

FIG. 2 is an external view of a typical smartphone device 100. The device 100 is dominated by the touchscreen 108. A user 200 is interacting with the touchscreen 108 such as by making one or more gestures 210 on the surface of the touchscreen 108 with their finger. As is known in the art these gestures 210 are detected by a touch sensor 110 and fed to the CPU 102 via controller 111.

Figure 3:
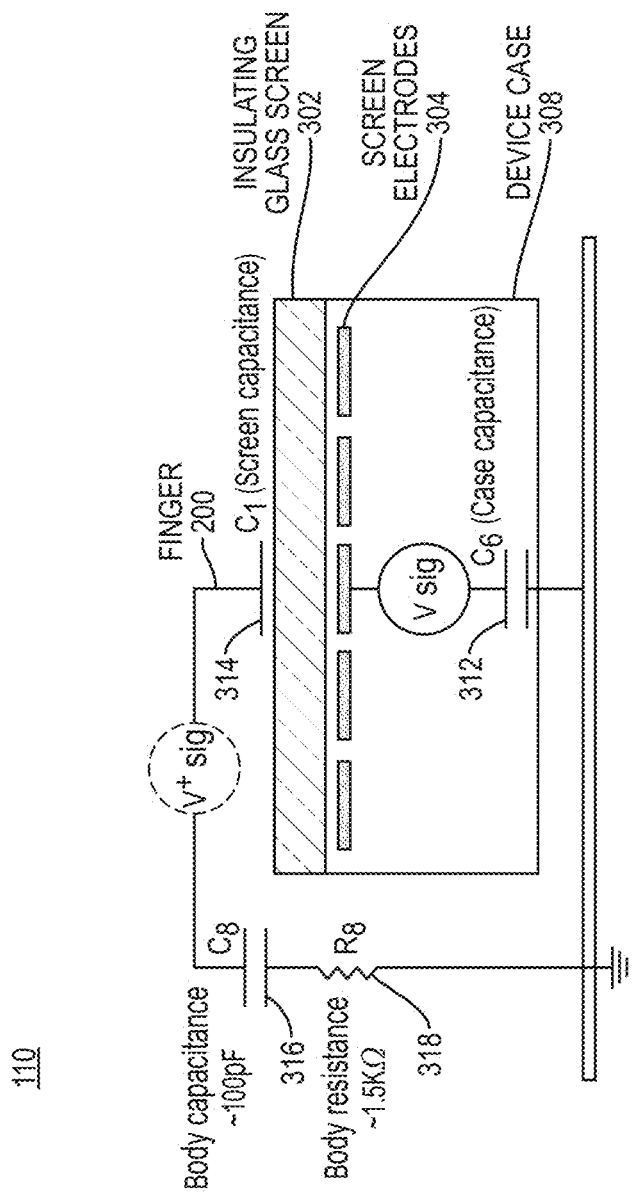
FIG. 3 is a more detailed circuit diagram of a touch sensor.

A typical touch sensor array is shown in more detail in FIG. 3. Such mutual capacitance touchscreens use projected-capacitance (pro-cap) grid structures where every electrode 304 intersection can be unambiguously identified as a touch point. In one example, the electrodes 304, arranged as grid lines, are transparent direct current (DC) conductors 0.002 inches wide with a grid line spacing of 0.25 inches. This is similar to fingerprint sweep sensors (e.g. Fujitsu MBF300) that also use capacitive sensors, albeit at a higher spatial resolution (500 dpi). In a smartphone 110, there is typically a protective cover glass lens 302 laminated to the touch screen with a thickness of 0.5 mm.

C. Epidermal Finger Pattern Recognition Via Capacitor Sensor Grid

As alluded to above, a finger "image" algorithm provides user identification from a sparse data set, sufficiently accurate for continuous user authentication. The projected capacitance touchscreen 108 presents an especially attractive and transparent method to accomplish this active user verification.

Figure 4:
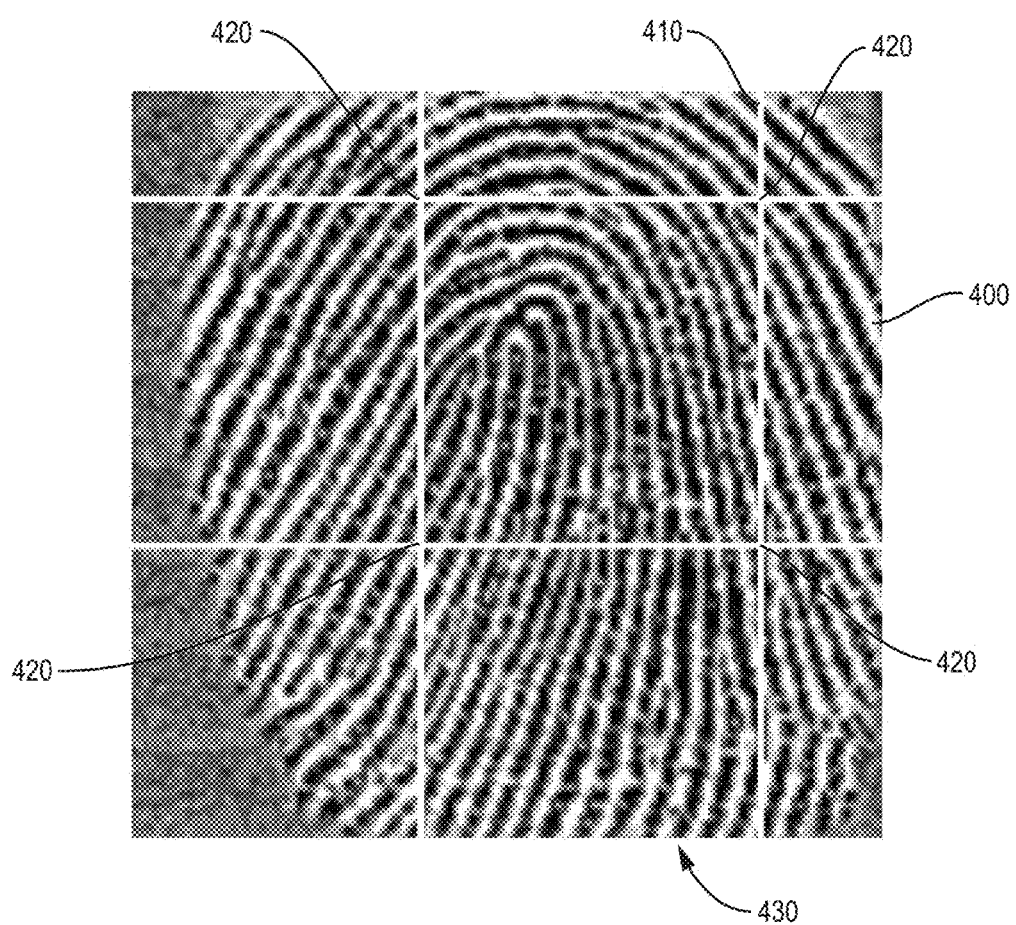
FIG. 4 illustrates touch sensor grid lines superimposed on a typical fingerprint.

More particularly, as a user's finger impedes the proximity of an electrode 304, the mutual capacitance between electrodes 304 is changed. FIG. 4 depicts an example fingerprint 400 with the capacitive grid lines 410 overlaid. In this example, the grid lines 410 are superimposed on a fingerprint 400 at four grid intersections, creating four data collection points 420. The fingerprint ridges 430 are approximately 0.5 mm wide. As the user's finger 200 slides up, down, and across the grid 410 during normal interaction with the smartphone (using application software and other functions not necessarily related to user authentication processes), the ridges and valleys of the fingerprint 400 are sensed by the difference in mutual capacitance of a ridge versus a valley in proximity to a grid collection point 420. This superimposes a one dimensional (1-D) profile in time of the "fingerprint terrain" imposed on the intersecting wires. At any given time, the finger 200 could be traversing several collection points in the grid. Each such collection point adds information to the data set, and the data set grows over time proportional to the amount of touch activity. For example, in FIG. 4 there are four different profiles simultaneously extracted from the four collection touch points 420. This can occur continuously, even when the user is not actively or consciously engaged in an authentication input session.

In one example, the projected capacitive (pro-cap) touch sensor grid is a series of transparent conductors which are monitored for a capacitance change between one another. This change in capacitance is monitored for a series of iterations, circulating throughout the sensor grid up to for example, 200 cycles per second. This sample rate can be increased further by oversampling in the proximity of the calculated finger location, and skipping the grid sensors away from that location. The sampling function may be performed by a touch controller 111, such as the co-called PSoC chips available from Cypress Semiconductor.

The sensor grid 110 may produce a large change in capacitance with finger distance (height), even though the total capacitance is very low (total capacitance is in the picofarads range), allowing the difference between the ridge and trough on a fingerprint to be significant (measurable SNR). To verify this, a full wave FEM electromagnetic simulation was performed using Ansys HFSS, observing the change in impedance of a conductive grid line in close proximity to simulated human flesh material. The finger was assumed to have a real dielectric constant of 29 and a conductivity of 0.55 S/m. The material was moved from 25 mils (spacing when line sensor is in proximity to fingerprint valley) to 20 mils (distance to fingerprint ridge) from the sensor line, and an appreciable impedance change of 7.2% was observed due to the additional capacitance.

It should now be understood that these 1-D profiles represent information about the fingerprint of the user, but are not assembled into an actual visual image of the actual fingerprint as is done in prior fingerprint recognition. The data set instead contains many 1-D "terrain profiles" of the finger in various orientations, collected over time. This sparse data set is then correlated to a previous enrollment of the user. Data collected by the grid of sensors is compared (such as by using the techniques further described below or other correlation algorithm) to a database of previously authorized, enrolled users.

Figure 5:
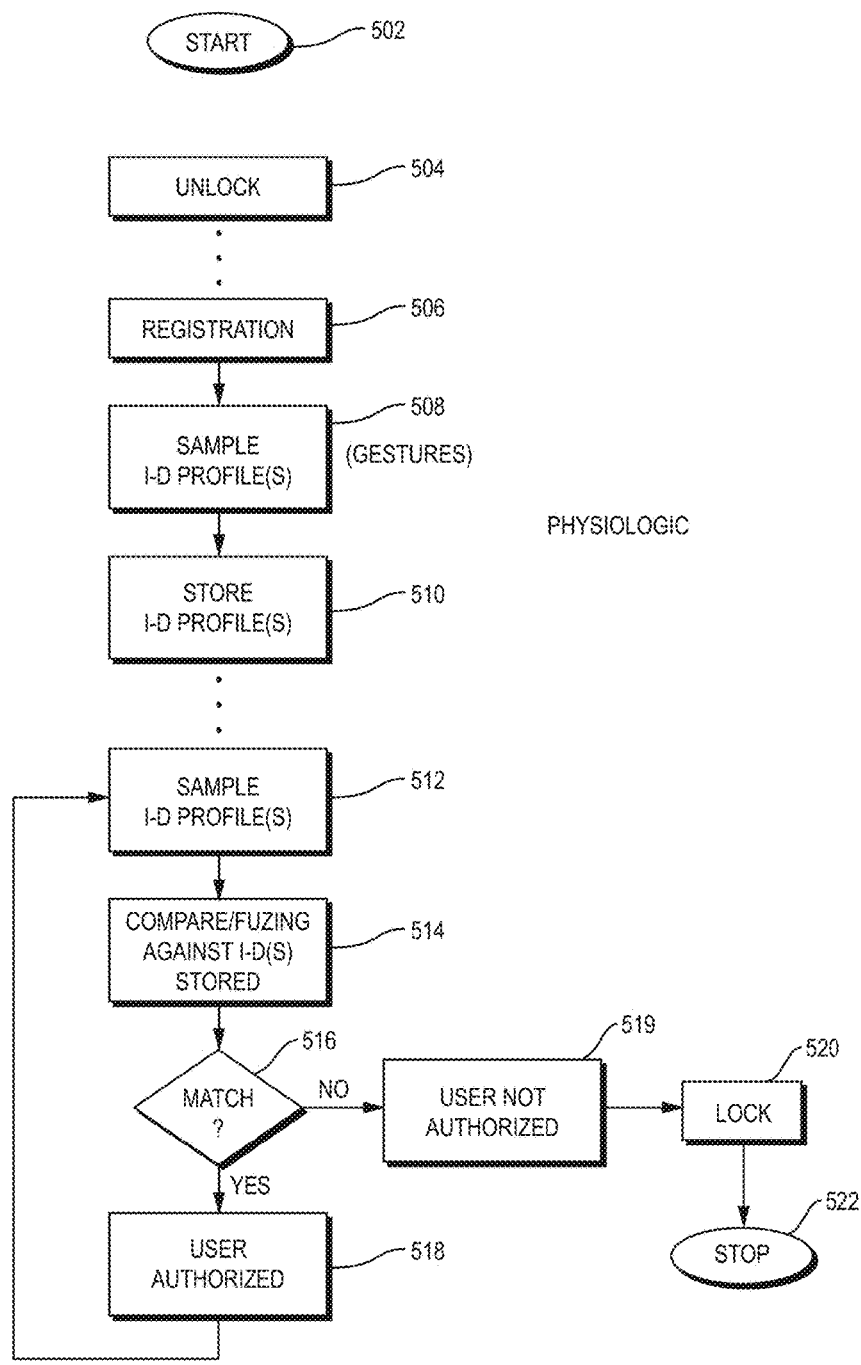
FIG. 5 is a sequence of operations performed to register and authenticate users using 1-D profiles of a physiological finger biometric attribute sensed with the capacitance grid structure of FIG. 4.

FIG. 5 is a sequence of steps that may be performed by the CPU 102 to implement active user verification using the 1-D profile spare data sets. In a first state 502 the process starts. In a next state 504 the device 100 may execute an unlock process. This may be by any of the known techniques such as a finger swipe or other gesture, entering a password, facial recognition or other technique.

At this point the user is initially known to be authorized to access the device 100 and a registration state 506 may be subsequently entered. From this state 506 one or more 1-D profile data sets are taken from the user. These samples are indicative of the user's fingerprint profile and will be used in later continuous authentication. One or more of the 1-D profiles are taken for example by collecting data from the four data collection points 420 discussed above, while the user is prompted to interact with the touchscreen. The data taken from the four collection points 420 is then stored as a set of 1-D profiles. One or more of these 1-D profiles may be taken in this registration mode.

Registration mode then ends and the CPU then proceeds to allow the user to perform other functions such as normal activities that the user would perform with their device 100. For example the user may execute application programs, games, make telephone calls, interact with the devices' operating system, and the like all interacting via the touchscreen. During this "normal activity" state a number of continuous authentication steps are taken preferably via a background process. In particular, 1-D profiles are taken in state 512 from the same set of touch points 420 as used for registration. In state 514 these are then compared against the previously stored 1-D profiles. If in, state 516, there is a match, then the user is retained in the authorized state 518 and processing can then proceed. The user thus has been verified as being an authorized user. However, if in state 416 there is not a sufficient match, a state 518 may be entered with the user no longer being authorized. This state may be entered only after only a single mismatch, or may be entered only after several mismatches are seen. From state 518, since the current user of the device has been detected as not being authorized, the device may enter a lock mode 520 which shuts down or otherwise stops further access in state 522.

Figure 6:
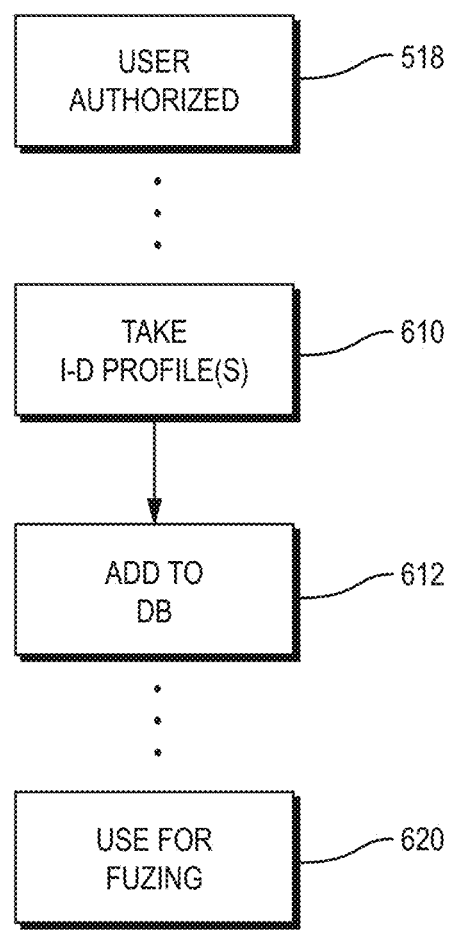
FIG. 6 is an example sequence of events for sensing additional 1-D profiles.

FIG. 6 shows a sequence of optional steps which the system may perform when the user authorized state 518 is active. For example, the system may take additional 1-D profiles. In state 610 these additional profiles may be used not just for continuous further authentication of the user but may be stored in the memory that is added to the 1-D profile database. These additional samples are then used for further matching in state 620 as further described below.

Figure 7:
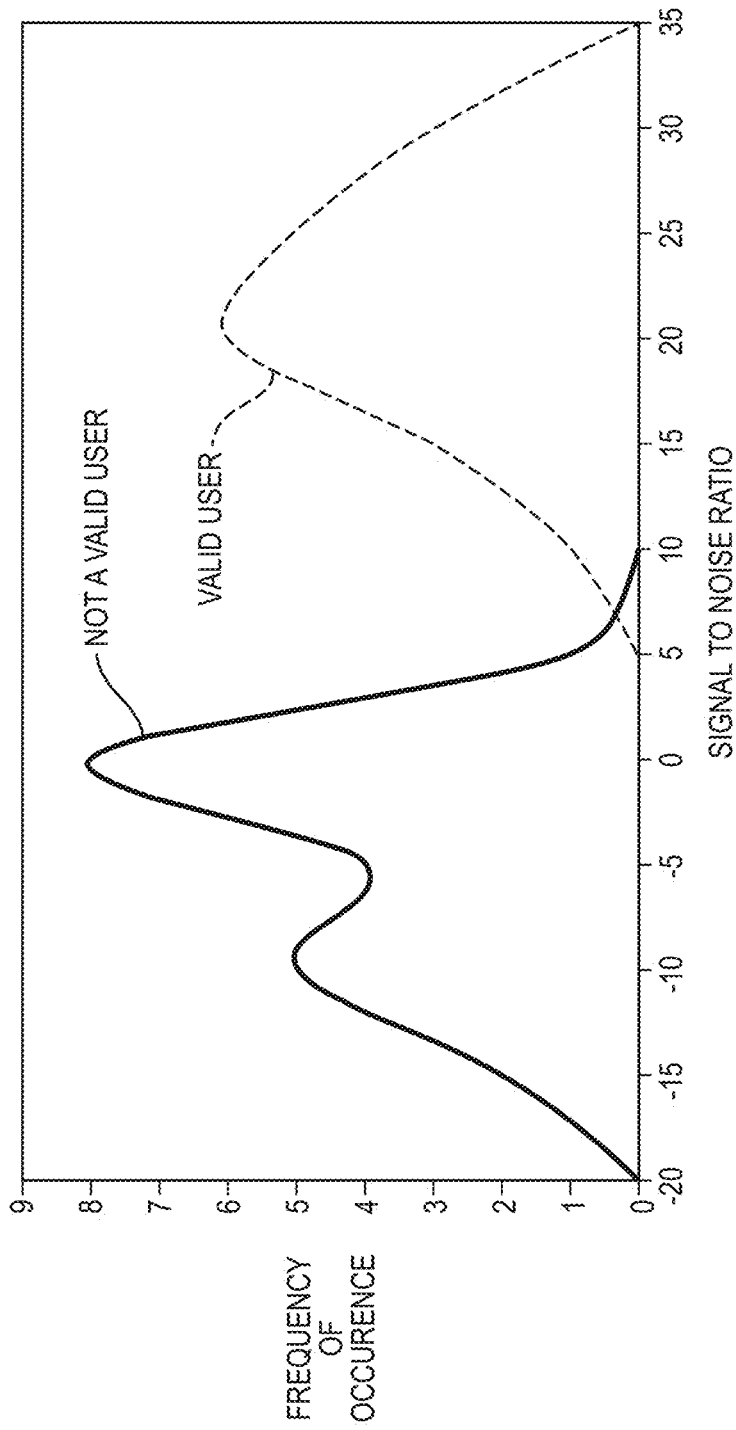
FIG. 7 is an example authentication decision diagram.

In order to assess the viability of the method with these expected sparse data sets, a set of previously obtained 1-D profiles were sampled via simulation and data input into a C-code model. FIG. 7 shows the resulting signal to noise ratio (related to a correlation factor by Equation (1) below) for a set of valid users and invalid users.

$$\text{Correlation Coefficient} = \frac{1}{\sqrt{1 + \frac{1}{S/N^2}}} \quad \text{(Equation 1)}$$

Figure 8:
FIG. 8 is a typical sparse fingerprint sample used in simulating the detection algorithm.

The results were a signal to noise (SNR) output when a sparse piece of fingerprint information was compared to a database of forty (40) National Institute of Standards and Technology (NIST) fingerprints. Half were considered authorized users, and the other half non-authorized. The sparse fingerprint information used in this example was a 0.1 inch wide strip of a fingerprint image as shown in FIG. 8.

FIG. 7 shows the results of running the 40 fingerprints through the verification simulation. The distributions for the valid users and the invalid users are separated such that both false acceptance and false rejection rates is expected to be low. The low end tail of the valid user distribution is caused by three finger prints known to be smudged in the test group. While the simulation results were accomplished using the two-dimensional strip of FIG. 8 the actual profile generated by the touch points can be a set of 1-D profile measurements.

In fact there would be a multitude of 1-D profiles generated by the touch screen, available to be fused together, using the techniques discussed further below. As per FIG. 6, the number of these 1-D profiles will grow as the user continues to use the device by several dozen per second, depending on rate of touch. Each additional data set may be used to increase the confidence of identification when fused together.

D. Habitual Gesture (Kinematic) Recognition

An active kinematic gesture authentication algorithm may also use the same 1-D profile data sets derived from the same touchscreen 108 sensors. It is designed to derive general biometric motion and compensates for variability in rate, direction, scale and rotation. It can be applied to any time series set of motion detected by the capacitive grid. The preferred implementation is intended for personal signature authentication using the repeated swiping motions on the touchscreen. Touchscreen gestures provide point samples for position, rate, pressure (spot size) and amplitude samples from each sensor point 420 within the spot size. A kinematic authentication algorithm then compares these and other features against known user characteristics and provides a probability of error.

Figure 9:
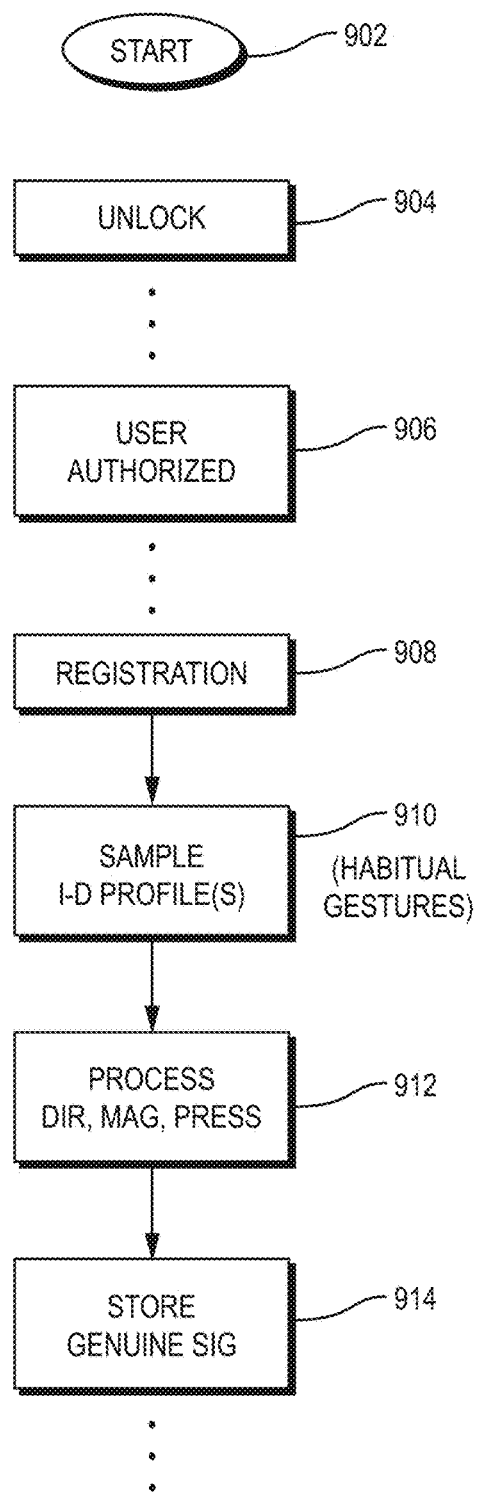
FIG. 9 is a sequence of operations performed to register a user with biometric behavioral or other habitual gesture such as a handwritten signature.
Figure 10:
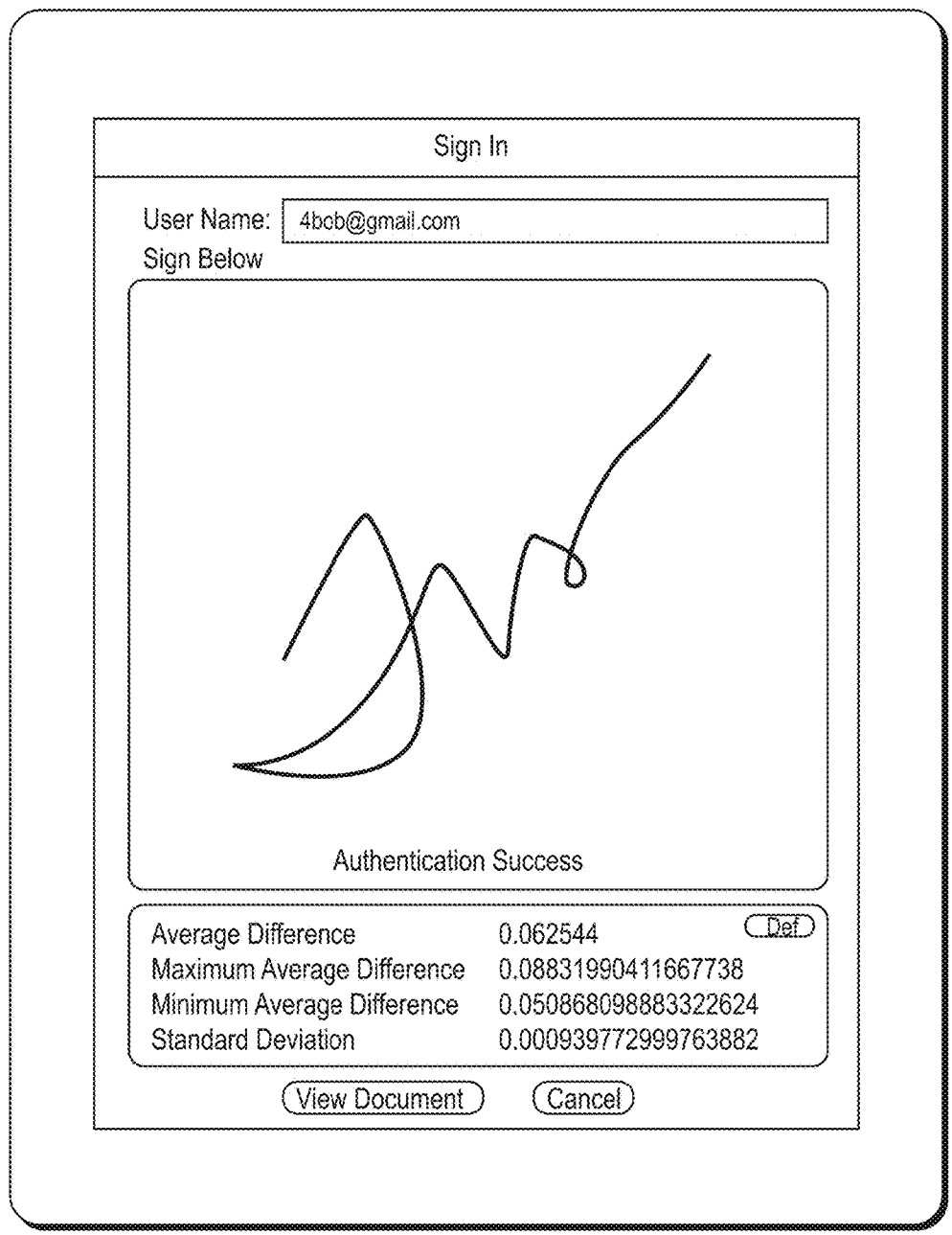
FIG. 10 is a typical enrollment screen.

FIG. 9 shows a signature registration process. From a start state 902 the device 110 may next perform an unlock sequence 904. Eventually a state 906 is reached in which the user is known to be authorized. State 908 is then entered in which a registration process proceeds. The user may be presented with a screen, such as that shown in FIG. 10, where the user is prompted to perform a kinematic gesture, preferably a habitual gesture such as a signature. In state 910, 1-D profiles from the sensor array are sampled and stored of this kinematic gesture. The samples are then processed to determine direction, magnitude pressure and potentially other attributes of the habitual gesture in state 912. In state 914 this information is then stored as that user's genuine signature profile.

Figure 11:
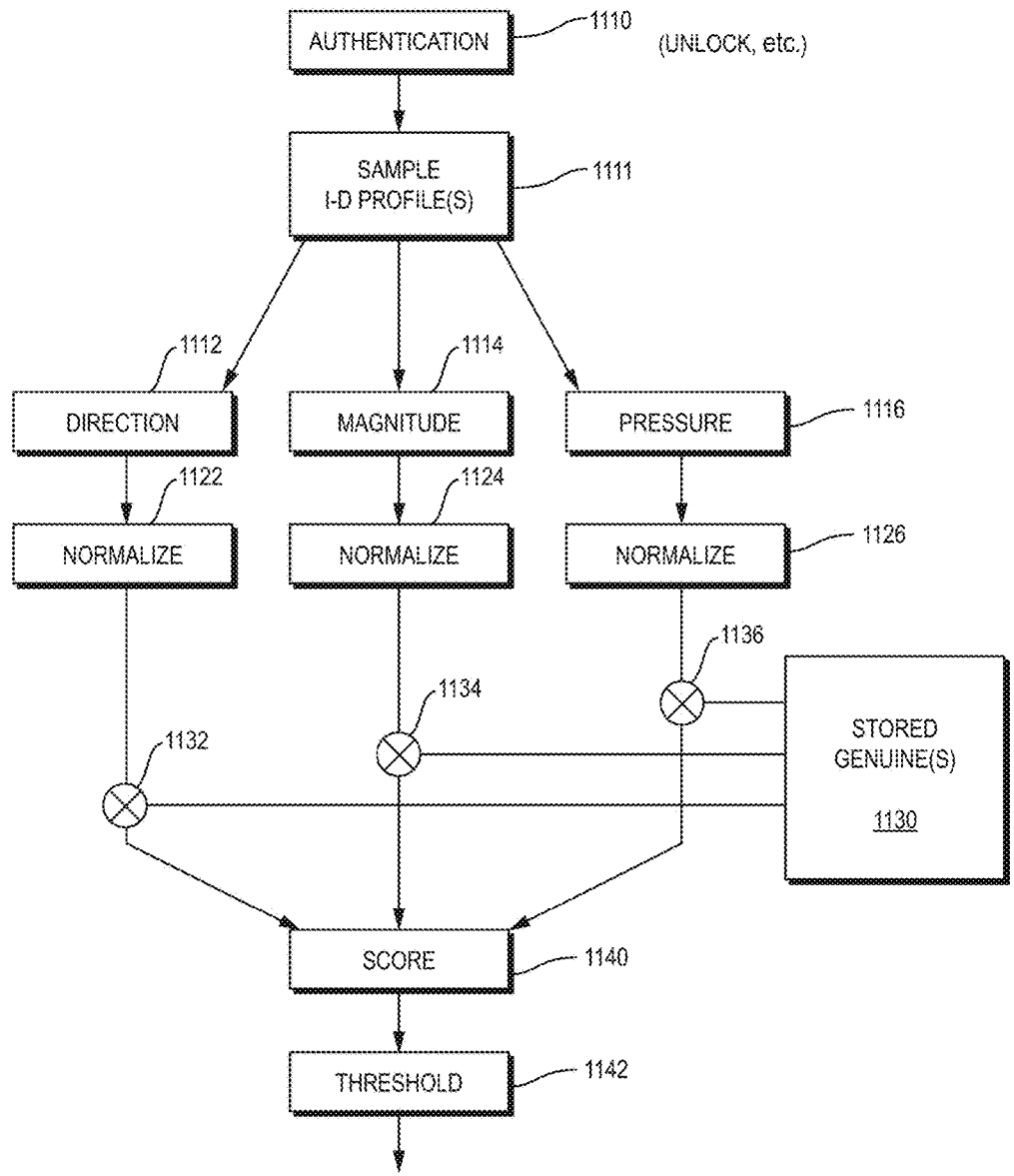
FIG. 11 is a typical sequence of operations performed to authenticate a habitual gesture via 1-D profiles taken from the sensor grid of FIG. 4.

A functional block diagram of the companion kinematic authentication algorithm is shown in FIG. 11. The input to the algorithm includes two (2) or more reference time series point sets (stored as the genuine signatures in state 914) and an unknown series detected from a present user. The algorithm uses raw reference data sets, and does not require training. The algorithm performs compensation for scaling and rotation on each of the point sets, and then compares the individual reference sets to the unknown producing an error value for each. The errors are combined into a single value which is compared to a standard deviation threshold for the known references, which produces a true/false match.

FIG. 11 shows one example method for kinematic signature feature extraction, normalization and comparison for use as biometric authentication (it will be understood that others are possible).

As shown in FIG. 11, a state 1110 is entered in which authentication of a current user of the device 110 is desired using the habitual gesture (kinematic) algorithm. This may be as part of an unlock sequence or some other state where authentication is needed. A next step 1111 is entered in which samples of the 1-D profiles are obtained per the techniques already described above. The 1-D profiles are then submitted to direction 1112, magnitude 1114, and pressure 1116 processing.

More particularly, step 1111 extracts features from the set of biometric point measurements. The direction component is isolated at state 1112 from each successive pair of points by using the arctangent of deltaX and deltaY resulting in a value within the range of −PI to +PI. This results in the direction component being normalized 1122 to within a range of 2*PI.

The magnitude component is extracted in state 1114 by computing the Euclidian distance of deltaX, deltaY and dividing by the sample rate to normalize it at state 1126. There may be other measurement values associated with each point such as pressure 1116, which is also extracted and normalized 1126.

The set of extracted, normalized feature values are then input to a comparison algorithm such as Dynamic Time Warping (DTW) or Hidden Markov Model for matching (1132, 1134, 1136) against a set of known genuine patterns 1130 for identification.

For signature verification, the normalized points are derived from a set of library data sets which are compared to another normalized set to determine a genuine set from a forgery. The purpose of normalization 1112, 1114, 1116 is to standardize the biometric signature data point comparison. Prior to normalization, the features are extracted from each pair of successive x, y points for magnitude 1114 and direction 1112. The magnitude value may be normalized as a fraction between 0.0 to 1.0 using the range of maximum and minimum as a denominator. The direction value may be computed as an arctangent in radians which is then normalized between 0.0 to 1.0. Other variations may include normalization of the swipe dynamics such as angle and pressure. The second order values for rate and direction may also be computed and normalized. The first order direction component isolates from scaling. A second order direction component will make it possible to make the data independent of orientation and rotation.

To verify, several genuine signatures are preferably used as a 'gold standard' reference set. First, the genuine reference set is input, extracted and normalized. Then each unknown scan is input, extracted and normalized and compared point by point against each signature in the genuine reference set.

To perform the signature pair comparison, a DTW N×M matrix may be generated by using the absolute difference between each corresponding point from the reference and one point from the unknown. The matrix starts at a lower left corner (0,0) and ends at the upper right corner. Once the DTW matrix is computed, a backtrace can be performed starting at the matrix upper right corner position and back-following the lowest value at each adjacent position (left, down or diagonal). Each back-position represents the index of matching position pairs in the two original point sets. The average of the absolute differences of each matching position pair is computed using the weighted recombination of the normalized features. This is a single value indicating a score 1140 as an aggregate amount of error between the signature pairs.

The range of each error score is analyzed and a precomputed threshold 1142 is used to determine the probability of an unknown signature being either a genuine or an outlier. The threshold value is determined by computing error values of genuine signatures against a mixed set of genuine signatures and forgeries. The error values are used to determine a receiver operating characteristic (ROC) curve which represents a probability of acceptance or rejection.

Figure 12:
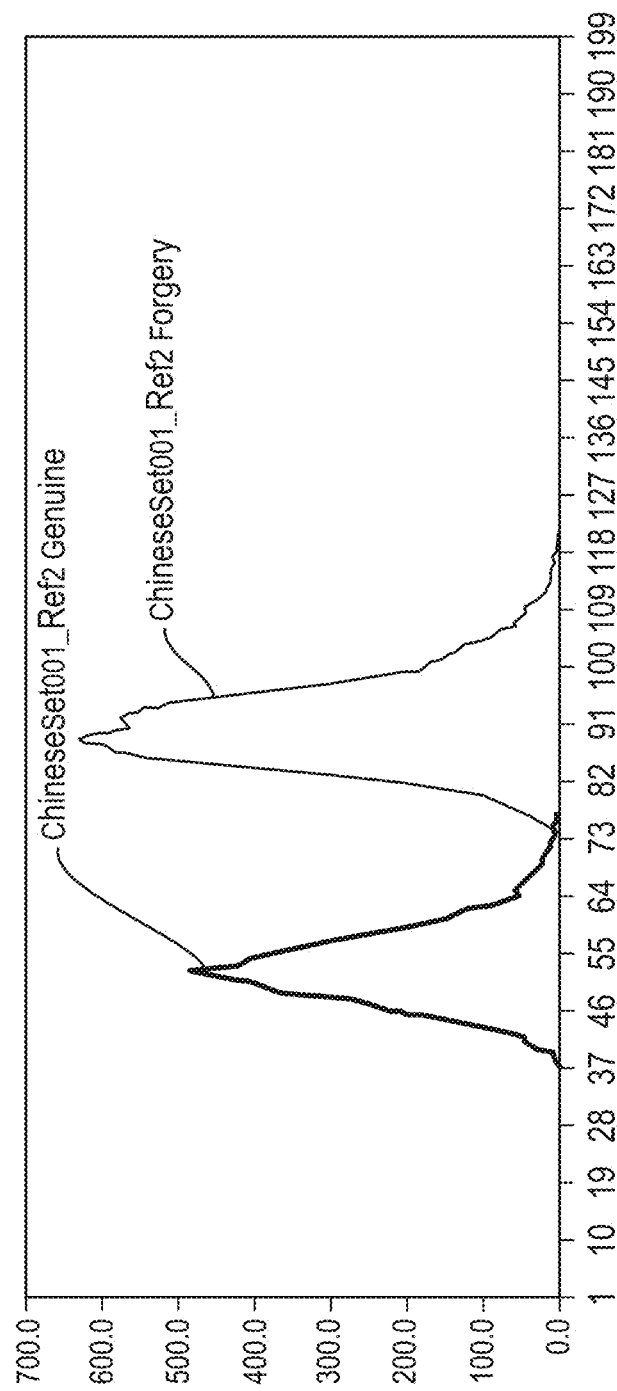
FIG. 12 is typical authentication decision for a detected habitual gesture.

The kinematic algorithm was implemented in a functional online demonstration. Signature collection was performed on an Apple™ iPad and interfaced to a server which contained the reference signatures and the authentication algorithm. In this set-up, signatures of several data bases were used with the most significant being the test data set from SigComp2011. Each individual supplied 24 genuine reference signatures with several skilled forger individuals providing an equal number or more of forgeries. The probability distribution for the set of Chinese signatures from person 001 (ChineseSet001) which has 24 genuine signatures and 36 forgeries, is depicted in FIG. 12. The peak on the left represents genuine signatures, and the peaks on the right represents forgeries. Excellent separation exists between distributions. The average Equal Error Rate (EER) for all genuine signatories was 1% using 14 reference signatures and 2.4% using only 2 reference signatures. This implies a better accuracy than the winner of the Sig-Comp2011 competition who averaged greater than 3% on both False Accept and Reject (FAR/FRR).

E. Combining Epidermal and Kinematic Recognition/Fusion

In this approach, we authenticate a user by exploiting both their (1) habitual touchscreen gestures (as per FIG. 11) along with (2) the epidermal characteristics of their finger or "finger image" (as per FIG. 4).

The kinematic touchscreen gesture authentication algorithm exploits the biometric modality of habitual human motion in order to verify an individual who has previously registered their personal data movements. This modality is not in wide use and is extremely difficult to imitate because it contains motion timing that can only be replicated by skillful and intense observation.

In one implementation, the sparse resolution sampling of a projected capacitive touch screen can be used to uniquely identify a registered user from the 1-D profiles collected via the pro-cap sensor grid 110. As one example, the Neuromorphic Parallel Processing technology, such as that described in U.S. Pat. No. 8,401,297 incorporated by reference herein, may be used. Processing may be distributed at a network server level to fuse these different biometric modalities and provide another level of authentication fidelity to improve system performance. The aforementioned Neuromorphic Parallel Processor technology for multimodal fusion, specifically the fast neural emulator, can also be a hardware building block for a neuromorphic-based processor system. These mixed-mode analog/digital processors are fast neural emulators which convolve the synaptic weights with sensory data from the first layer, the image processor layer, to provide macro level neuron functionality. The fast neural emulator creates virtual neurons that enable unlimited connectivity and reprogrammability from one layer to another. The synaptic weights are stored in memory and output spikes are routed between layers.

Figure 13:
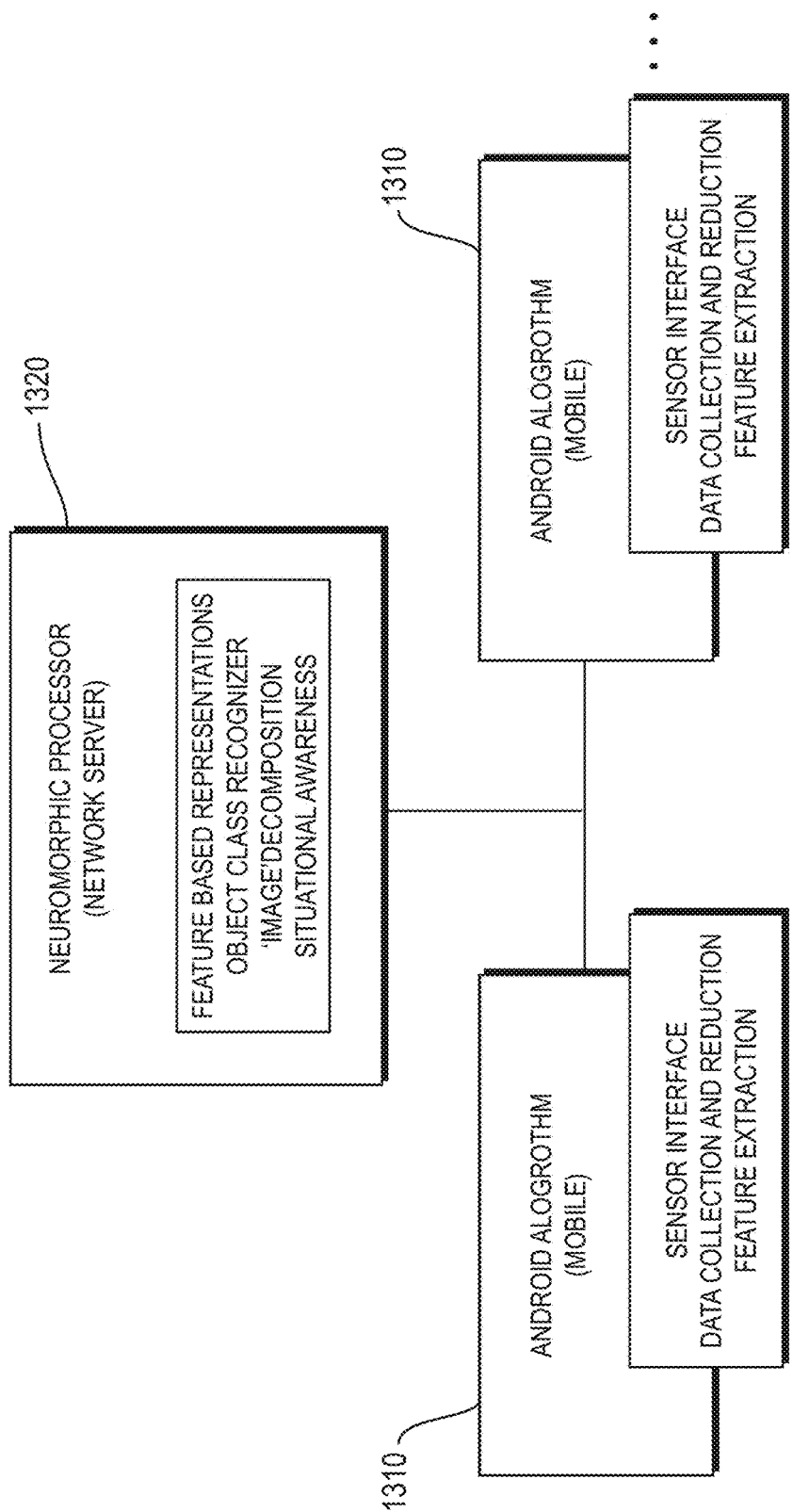
FIG. 13 is an active authentication processing architecture.

The preferred architecture follows the process flow of the active authentication application as per FIG. 13. A server application 1310 continues to validate the user—but resides as part of a network including the devices 110 at a server. This is where the higher layers of the neuromorphic processor can reside. The mobile platform 110 fuses touchscreen movement and finger 1-D profile data and provides 1310 an evaluation of the level of confidence using local pattern recognition algorithms, as described above.

Processing, identification and validation functionality 1310 may reside on the mobile platform 110 as much as possible. In order to accommodate potential commercial mobile platform microprocessor and memory constraints, a more flexible architecture is to allow the entire chain of pattern recognition and active authentication to be accomplished by the mobile device as shown in FIG. 13. The mobile device acquires touchscreen data from the pro-cap controller 111, reduces data for feature extraction, and provides the applicable 1-D profile data sets of the gesture and finger image for classification, recognition and authentication to the server. This architecture also minimizes the security level of software in the mobile platform.

Figure 14:
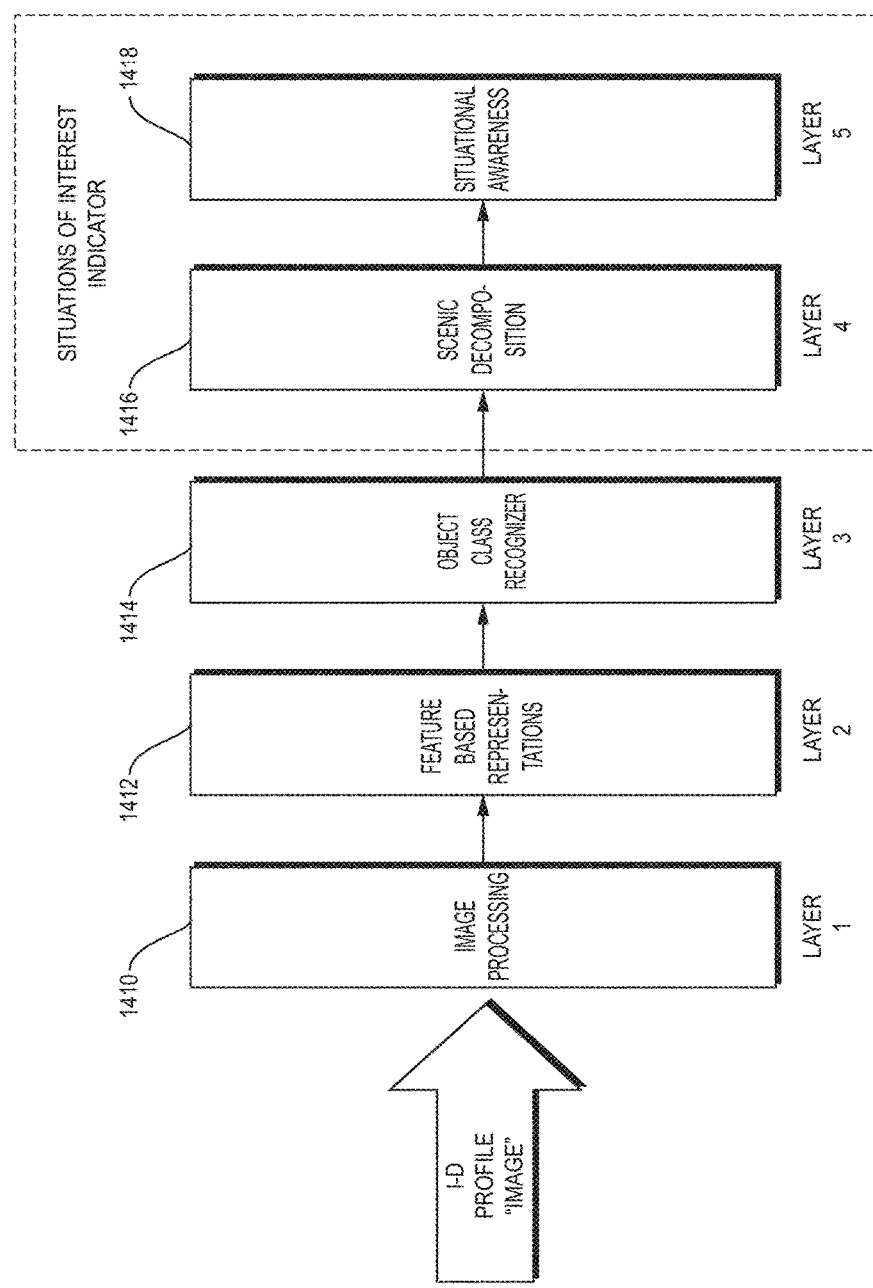
FIG. 14 is a more detailed view of a neuromorphic parallel processor that may be used to fuze results.

A functional block diagram of a stand alone neuromorphic processor which is optionally added to the device 110 and/or server is shown in FIG. 14. It has five (5) function layers. The processor contains components that are part of the first three layers. The first 1410 of these layers is an "image" processor. The second layer 1412 is populated with feature based representations of the 1-D profile objects such as finger 'images' or touchscreen habitual gesture, and is not unlike a universal dictionary of features. Here, the term 'images' is used to describe the multi-dimensional data set of 1-D profiles. The third layer 1414 is the object class recognizer layer, while the fourth and fifth layers are concerned with inferring the presence of situations of interest.

The design implementation of a five (5) layered neuromorphic parallel processor solution addresses the need for a low-power processor that can facilitate massive computational resources necessary for tasks such as scene understanding and comprehension. It is similar to that of a biological neuron with its mixed-mode analog/digital fast neural emulator processor capability where some key features are: Low Size, Weight and Power (SWaP), Low Loss, and Low Installation Complexity and Cost.

Figure 15:
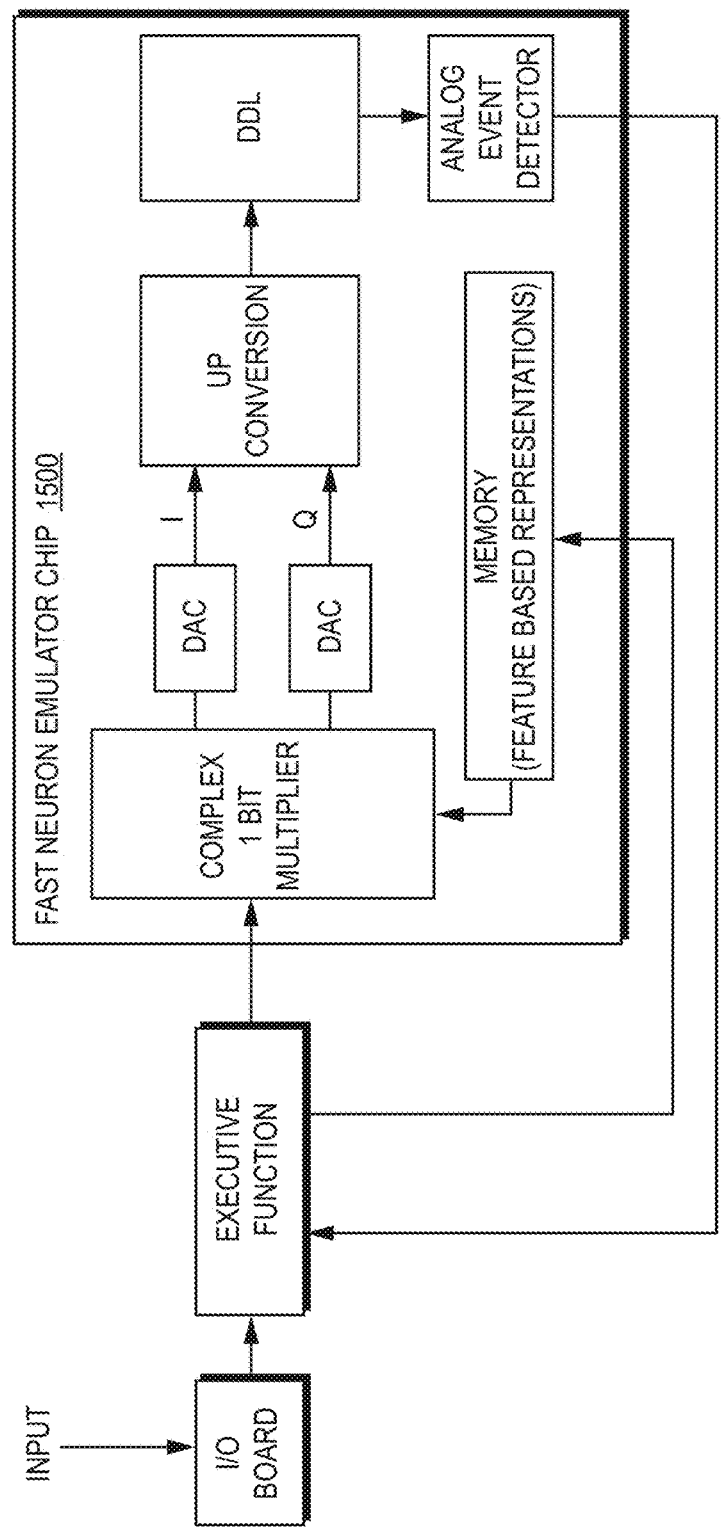
FIG. 15 is a more detailed view of one implementation of a fast neuron emulator.

One building block of the neuromorphic parallel processor can be a fast neuron emulator shown in FIG. 15. A convolution function is implemented by means of a chirp Fourier transform (CFT) where the matched chirp function is superimposed on the synaptic weights, which are convolved with the incoming data and fed into the dispersive delay line (DDL). If the synaptic weights are matched to the incoming data, then a compressed pulse is seen at the output of the dispersive delay line similar to the action potential in the neural axon. An executive function may control multiple (such as four (4)) fast neuron emulators 1500. The feature based representations are reduced dimensionality single bit complex representations of the original data.

The feature based representations of objects in the second layer 1414 of the neuromorphic parallel processor may be fused to obtain better performance when recognition of individual objects is the objective. Fusion of multimodal biometric data to achieve high confidence biometric recognition is used to illustrate the algorithm.

A biometric system can thus be divided into three (3) stages
1. Feature extraction, in which the biometric signature is determined,
2. Matching, in which the degree of match between an unknown signature and an enrolled signature is determined, and 3. Decision, in which the determination of whether or not a match is made.

Our preferred approach is based on fusion at the matching stage. In this approach, separate feature extraction is performed on each biometric input and a score is independently developed regarding the confidence level that the extracted signature for each modality matches a particular stored (e.g., authenticated) biometric record. Then a statistical combination of separate modal scores is done based on the scores and the known degree of correlation between the biometric modalities.

The scores are weighted by the source data quality in both the enrollment and the captured image to give preference to higher quality capture data. If the modes are completely independent (such as habitual gesture and fingerprint terrain) the correlation is near zero and the mode scores are orthogonal resulting in maximum information in the combined score. If there is a correlation between the modes, the scores are not completely orthogonal, but neither are they coincident, allowing additional confidence information to be extracted from the orthogonal component.

F. Scaling 1-D Finger Profiles for Swipe Velocity

As explained above, the output(s) of the touchscreen array 108 provide one or more time-varying signal(s) representative of ridge and valley detail of the user's fingerprint, as the finger swipes by each array intersection point. As the finger moves along a track on the touchscreen sensor over time, a different portion of the finger contacts a given intersection point at different points in time. The output of these intersection points is thus a –1D signal which varies as a function of time, and which also corresponds to a profile of the fingerprint as the finger moves with respect to the grid intersection. The resulting signal is very good fit to the detail of the user's fingerprint along the track. This is because the 1-D signal data "peaks" and "troughs" line up with "ridges" and "valleys" of the corresponding portion of a two-dimensional image of the user's fingerprint.

Therefore, in some implementations, the 1-D user profile signals collected from the touchscreen array may be matched against previously enrolled two-dimensional user fingerprint images. These images may be collected from some other source, such as a dedicated fingerprint reader, or an available database. Regardless of their source, the two-dimensional fingerprint images are processed into a template database for use in the user verification process. These fingerprint images are then correlated against information obtained from the 1-D user profile signals, such as by using the neuromorphic processing techniques described above.

Figure 16:
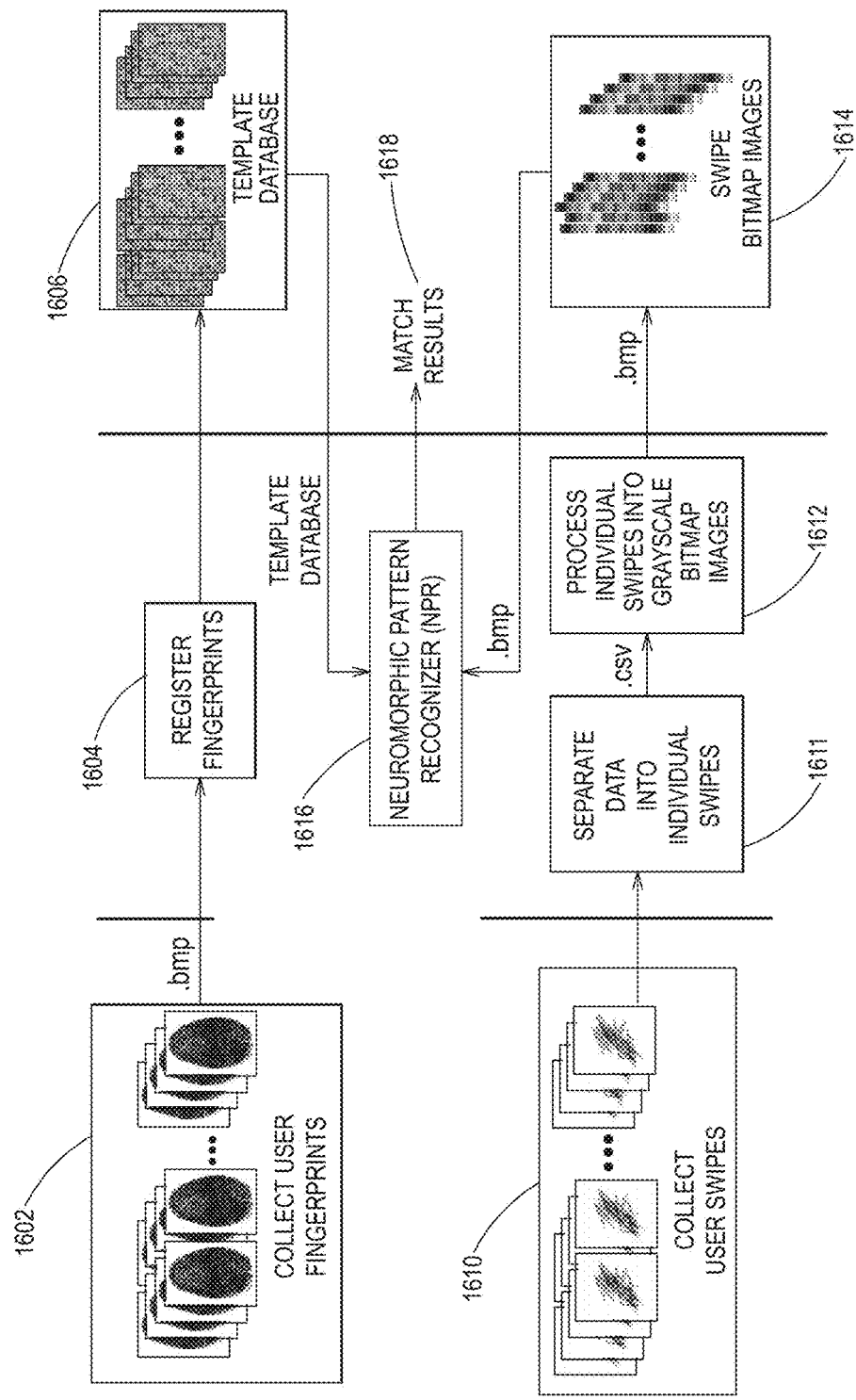
FIG. 16 shows a process of matching one-dimensional time varying data collected from the touchscreen against enrolled fingerprint image files.

FIG. 16 illustrates this process 1600. In a first data collection step 1602, the two-dimensional fingerprint image data (such as the example fingerprint 400 of FIG. 4) are collected from some source and stored in some image format, such as a bitmap file (.bmp). This known valid fingerprint is then registered in step 1604 and templates formed and stored in a template database 1606. At step 1610, one or more 1-D time varying signals are collected as the user makes one or more finger swipes along the touchscreen array. These 1-D time varying signals are separated into individual swipes in step 1611. Step 1612 processes the individual swipes into a format, such as a .bmp file containing a sequence of grayscale values, to produce one or more swipe bitmap image files. Each such .bmp file represents the ridge and valley detail of a portion of the user's finger that passed by a given intersection point during the swipe. The swipe bitmap image files(s) 1614 from step 1612 can now be correlated against the enrolled image template(s) 1606. This correlation (pattern recognition) step 1616 can be performed using the neuromorphic processor previously described. The match results 1618 may then be processed and used to, for example, permit or deny the user access to the touchscreen device 100.

The raw 1-D profile signals obtained from the touch array in step 1612 may also be subjected to several types of signal processing steps prior to correlation. For example, various filtering methods may be used to filter out noise from the actual ridge and valley data in the 1-D time varying signal.

As also mentioned above, the variable speed and location of finger movement may be taken into account prior to bitmap generation. That is, finger velocity over a given array sensor can be expected to vary, requiring adjusting the data to constant velocity prior to filtering of the noise from the signal. The selected filtering of the sensor data may include a least squares fit with a moving average smoothing function.

Figure 17C:
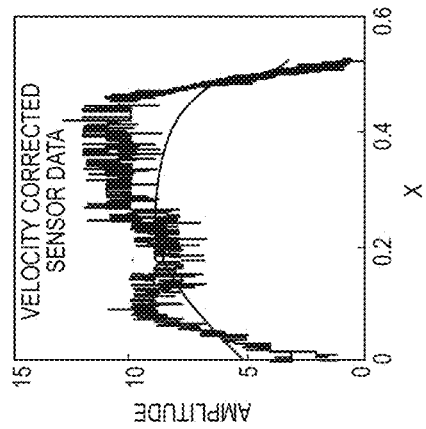
FIGS. 17A to 17D illustrate velocity-corrected data.
Figure 17B:
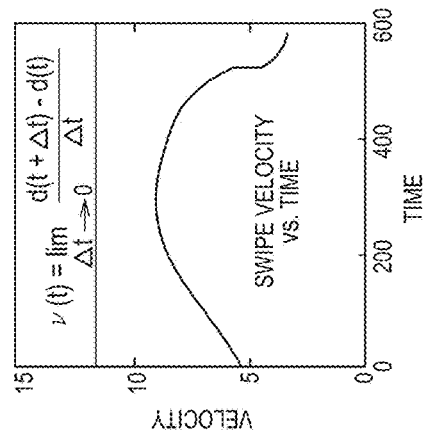
Figure 17A:
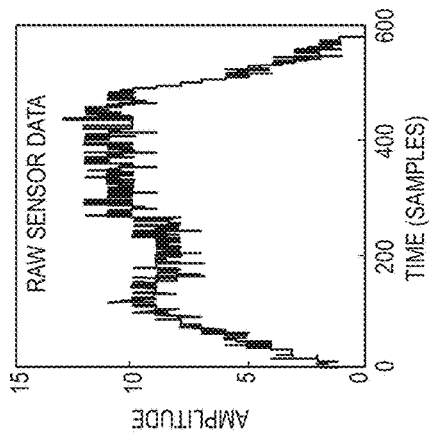
Figure 17D:
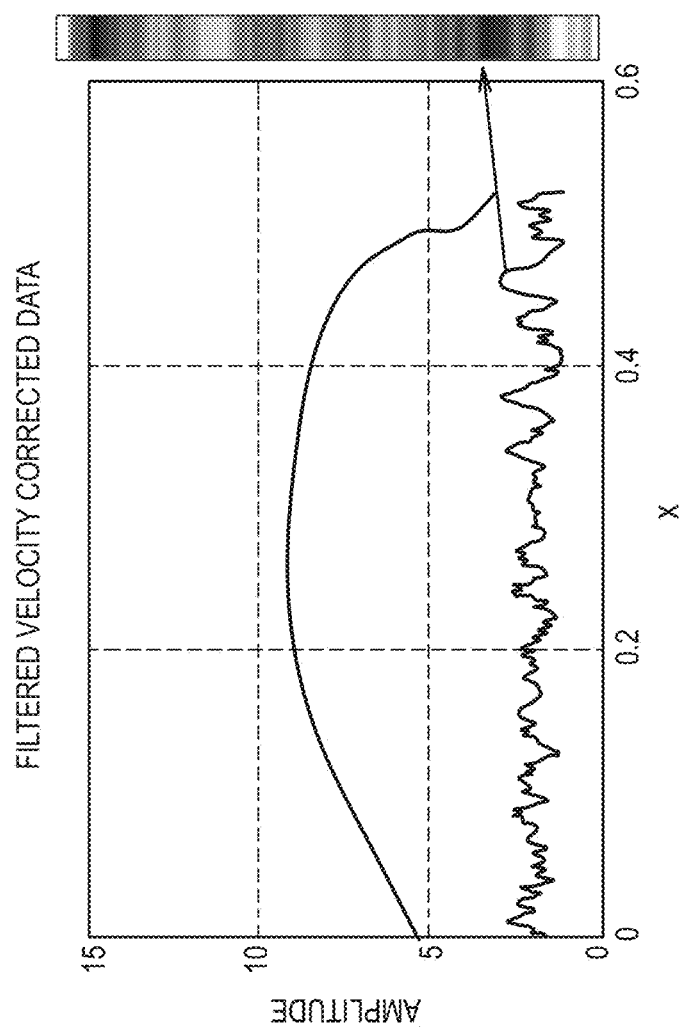

FIGS. 17A-17D show this processing in more detail. Example raw data from a given sensor is shown in FIG. 17A. A swipe velocity versus time signal, per FIG. 17B, may then also be generated, such as from the same finger position and rate information used for gesture detection For example, the finger centroid can be tracked over time to determine the finger velocity, v, such as by using the equation in FIG. 17B. Velocity-corrected sensor data may then be generated noting that position, x, is given by $x=\int vdt$ The data, after being corrected to constant-velocity, may then be filtered before being converted to a set of grayscale values as per FIG. 17D.

Figure 18A:
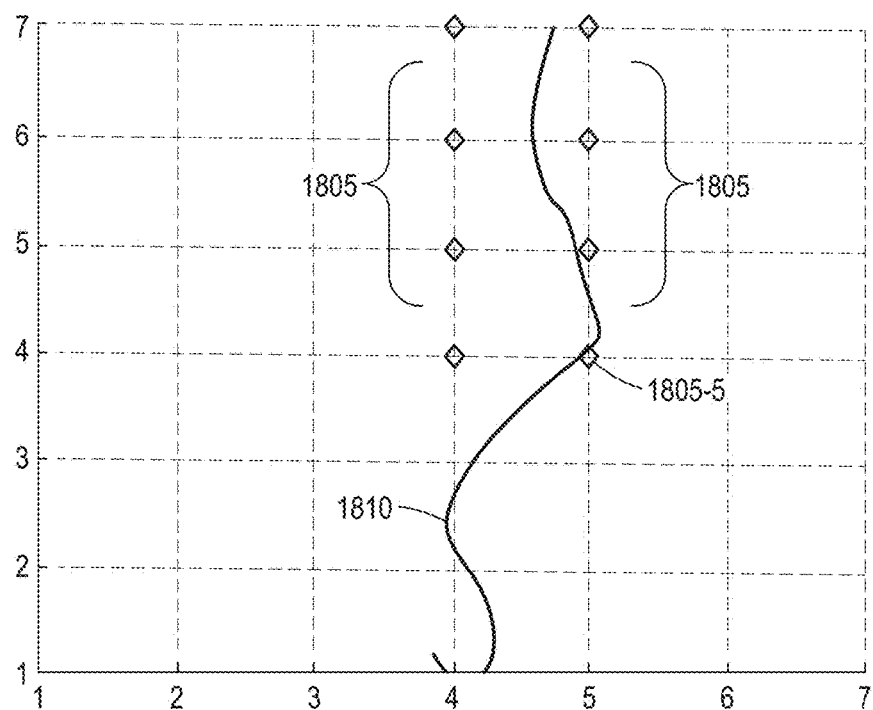

In another optional aspect of step 1612, only selected sensors located adjacent the finger swipe path may be selected for further processing. FIGS. 18A to 18C illustrate an example where a set of touchscreen sensors 1805 (that is, only those intersection points indicated by a diamond) produce outputs as the user's finger follows a path 1810. Step 1612 may then process only a single velocity-corrected output 1820 and filtered output 1830 (and single resulting bitmap file 1614) from the sensor 1805-5 which was closest to the path 1810. In other implementations, more than one such sensor output 1805 may be processed.

G. Verification Using Self Registration of a Known Valid User

The time varying signals representative of the ridge and valley detail of the user's fingerprint can also be advantageously used in a self-registration process. Briefly, a known valid user is prompted to engage in a controlled interaction with the touchscreen, such as by using their finger to follow the movement of an icon along a known path displayed on the touchscreen. The path may for example ensure that the entire ridge—valley profile is captured along a predetermined distance (the distance may, for example, be 120 inches). Since multiple sensors are typically activated at a given point in time as the finger progresses along the swipe path, the resolution of the resulting data can be expected to be approximately at least 0.02 inches. In other words, the effective path length is actually longer since anywhere from 2 or more sensors may detect a ridge or valley at any given point in time. The collected data is then stored as a template to be used in subsequent verification.

Some embodiments may further track the time-varying ridge and valley data as a function of X-Y location on the touchscreen grid. From that data, a two-dimensional contour plot may be derived and converted to a frequency domain template. One or more fingers may be processed in this way.

The resulting template is then used in a verification process. The device enters a verification mode such as upon initial power on, or when waking up from a sleep mode. The verification process must be successfully completed prior to the device unlocking for further use. In this process, the user is again prompted to follow a path displayed on the touchscreen, and time varying one-dimensional signals are collected as the finger moves along this path. The collected data may then be matched against one or more stored templates. In one embodiment, the Neuromorphic Pattern Recognition (NPR) algorithms described above are used for this matching step. When the matching algorithm determines that present user does not match any registered authorized user the device may be locked. In this way only authorize users can be permitted to unlock and further use the device.

As with the embodiments described previously, periodic updates of the registration data may be added to the valid user template(s) over time to ensure that it remains current.

Similarly, whether or not an authorized user continues to use the device may be continuously determined as the touchscreen is subsequently used to perform functions other than fingerprint recognition.

Figure 19A:
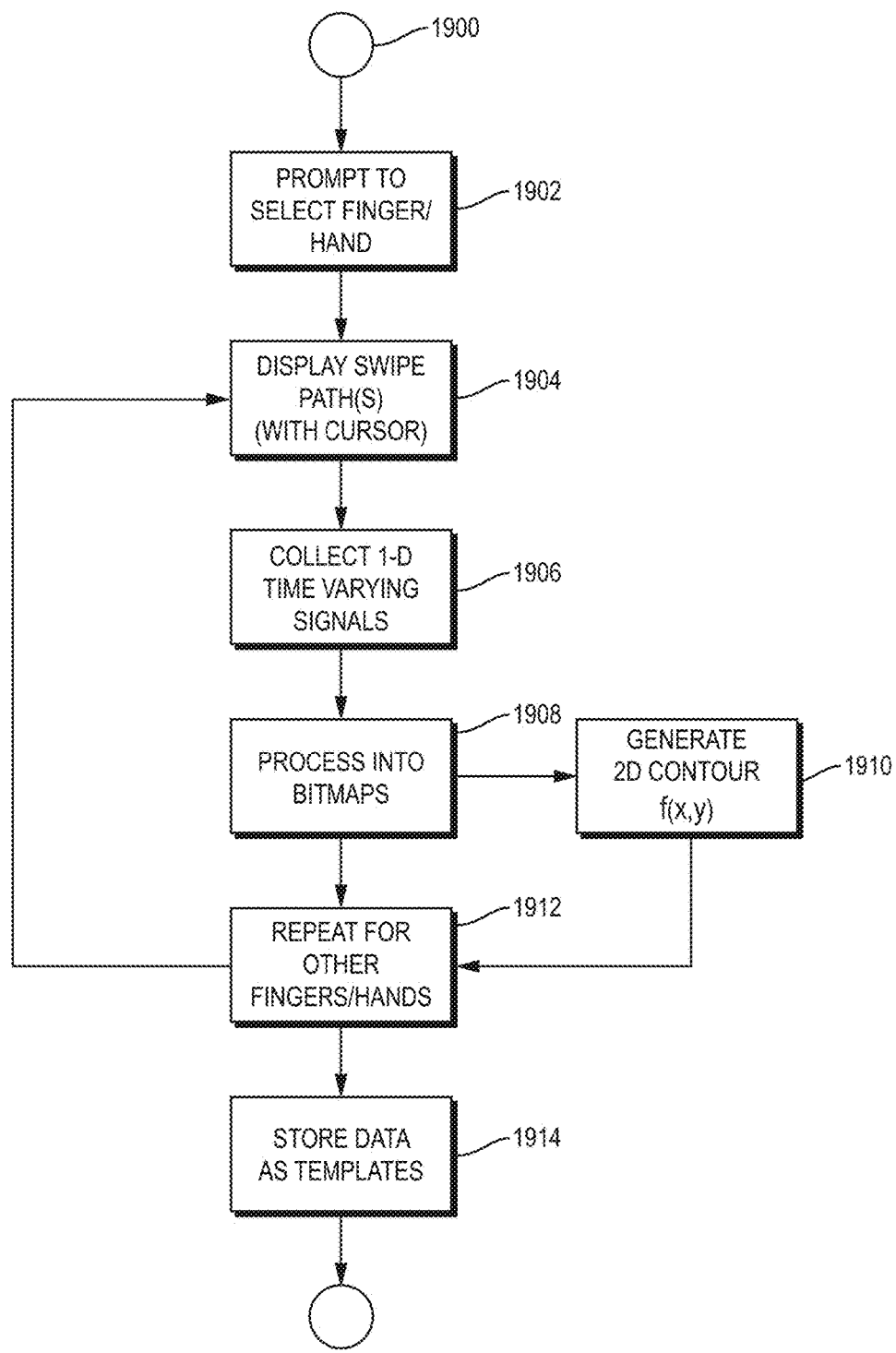

An example of the self-registration process is shown in more detail in FIG. 19A. In an initial state 1900 an application program is running in a mode that performs user self-registration. In this mode, the user is known to be valid user of the device, and the process is to enroll their fingerprint information. In the next state 1902, the user is prompted to select a specific hand and finger of that hand to be enrolled. Next, in state 1904, the user is prompted to swipe that finger on the touchscreen in a deterministic way, such as by following the path of a cursor that moves along a pre-defined swipe path. Two example swipes paths 1980, 1982 are shown in FIG. 19C. The swipe path may be indicated by a moving red ball 1990. In this state the user may be prompted with text instructions such as "Place your right index finger on the red ball and follow the path as the ball moves". The swipe path preferably has a length that is sufficient to reliably capture data that characterizes the user in a relatively short time, such as 30 seconds.

In state 1906, one-dimensional time varying signals are collected as the finger follows the path, in the manner described previously in connection with FIG. 4. As is evident from FIG. 4, it is quite possible that at a given point in time more than one sensor will be activated by the presence of the finger (in FIG. 4 for example, there are 4 touchscreen sensors covered by the finger). These one-dimensional, time-varying signals are then processed into corresponding bitmaps in state 1908, such as per the techniques already explained in connection with FIG. 16. In a case where more than one one-dimensional time varying signal is captured in any particular point in time, these signals can be associated with the X-Y coordinate of the sensor from which they were captured, and a time-domain two-dimensional contour plot is generated in state 1910. The contour plot may be converted to a frequency domain representation for further processing.

Once the swipe data is characterized (be it via a set of bitmaps or a contour plot), a state 1912 is reach where the user may be prompted to repeat the swiping process for other fingers.

Eventually state 1914 is reached where the data characterizing the authorized user is collected and stored as a template.

Figure 19B:
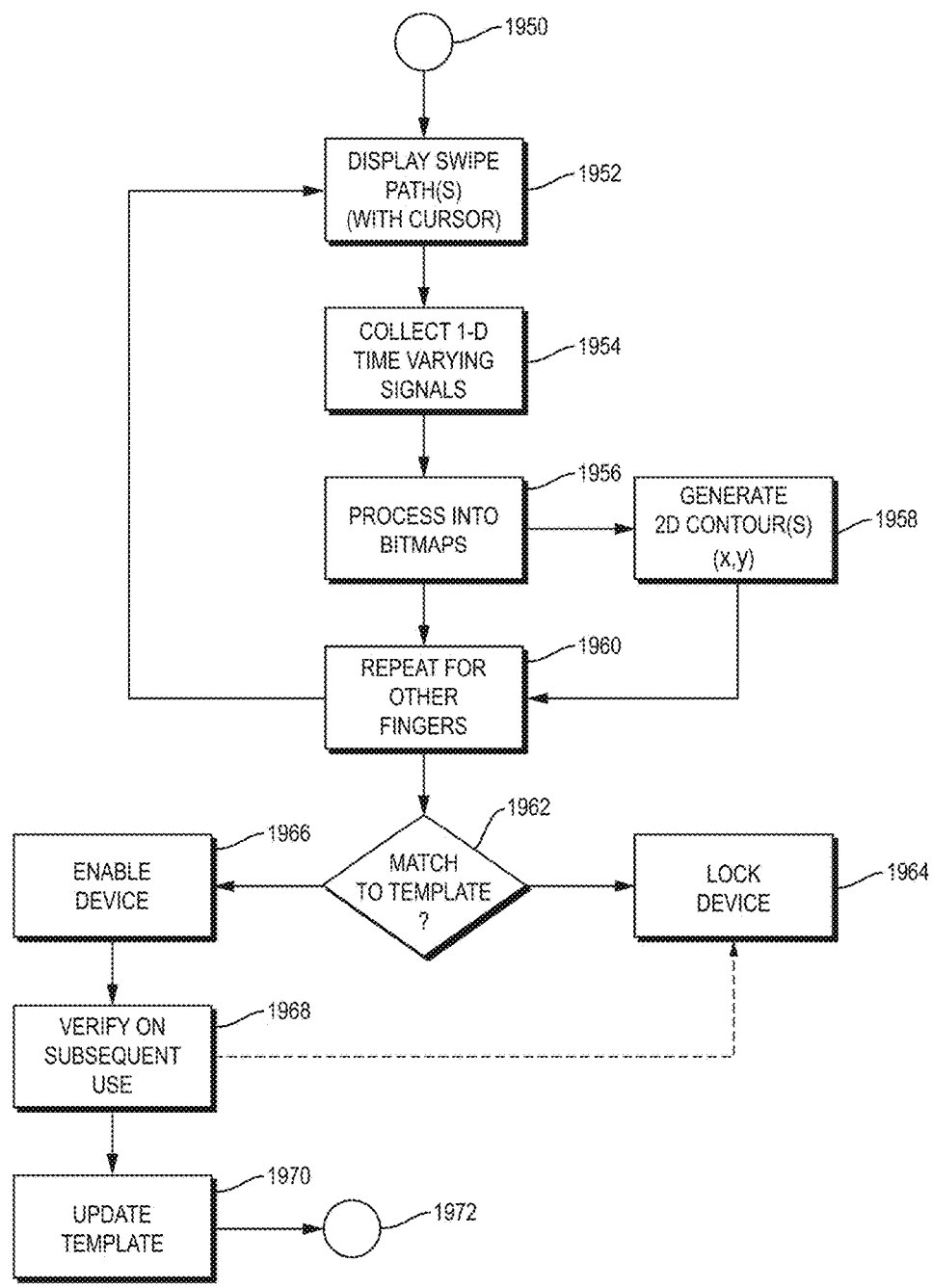

A corresponding user verification process is shown in FIG. 19B. At step 1950, the application program is in a state where an unknown user is wishing to gain access to the device. This state may be entered when the device is powered on or otherwise activated from a dormant state. In step 1952 the device prompts the user to engage in a predetermined action; for example, the swipe path is again displayed and the user is again prompted to follow the moving cursor with a specific finger. In state 1954 the one-dimensional time varying signals representative of ridge and valley detail are again collected, and in state 1956 these processed into bitmaps, as before. Again an optional step in 1958 may generate two-dimensional contour(s) and convert them to the frequency domain. These steps may also be repeated for other fingers if desired from state 1960.

Eventually a state 1962 is reached where an attempt is made to match the collected data to one or more stored templates. If no stored template is found, processing continues to step 1964 where the device is locked. If however a matching template is found, then in state 1966 the device is enabled for further use.

In subsequent states such as 1968 the one-dimensional time varying signals output from the touchscreen may be again verified and if they do not pass the device may be locked—even after it was initially locked.

In other optional subsequent steps, such as at 1970, the collected one-dimensional time varying data collected during the user verification process may be used to update the template.

It is now understood how a pattern recognizer, such as the Neuromorphic Pattern Recognizer (NPR) described above can be used to match user interactions with a touchscreen device in real-time and devise unique characteristics of the user's finger. In one implementation, an authorized individual may use the finger pattern detection methods in a self-enrollment process. Data may be collected during the self-enrollment process via a controlled suite of user interactions. The user interactions for example may include prompting the user to follow a specific swipe path on the touchscreen with their finger. One-dimensional time varying signals collected from touchscreen grid points are stored as a template that characterizes the registered user. The templates may then be used to later verify that a current user is a valid, registered user.

The invention claimed is:

1. A method for encoding information representative of a person's fingerprint comprising:
   receiving one or more outputs from a touchscreen array as the person's finger passes adjacent a corresponding one or more touch sensitive elements of touchscreen array;
   digitizing the one or more outputs to generate one or more corresponding one-dimensional time-varying digital signals, each digital signal comprising a sequence of digital amplitude values representative of a ridge and valley detail of a rectangular portion of the person's finger that passes adjacent the corresponding one of the touchscreen array elements as the person uses the touchscreen over time; and
   normalizing at least one of the sequence of digital amplitude values with respect to a velocity at which the person's finger moves.

2. The method of claim 1 additionally comprising:
   processing the sequence of digital amplitude values to determine a time-varying velocity signal representative of a velocity of the person's finger over time with respect to the corresponding touchscreen array element; and using the velocity signal in the step of normalizing.

3. The method of claim 1 wherein the sequence of digital amplitude values is further representative of a direction along which the person's finger moves with respect to the corresponding touchscreen array element.

4. The method of claim 1 wherein the step of normalizing further comprises:
normalizing the sequence of digital amplitude values by a time scale factor that depends on the velocity at which the person's finger moves with respect to the corresponding touchscreen array element.

5. The method of claim 1 additionally comprising:
converting the sequence of digital amplitude values to a corresponding image representation comprising a single row of pixel values, where each pixel value corresponds to a gray scale conversion of a corresponding digital amplitude value.

6. The method of claim 1 additionally comprising:
matching the sequence of digital values in one or more of the digital signals against stored information representative of the person's fingerprint.

7. The method of claim 6 wherein the step of matching additionally comprises:
rotating and/or translating a position of the sequence of digital values relative to the stored information representative of the person's fingerprint.

8. The method of claim 1 additionally comprising:
detecting a touchscreen gesture from the same one or more of the one-dimensional time-varying signals; and
using the touchscreen gesture for a function other than fingerprint characterization.

9. The method of claim 1 wherein a spacing between adjacent elements of the touchscreen array is at least ten times larger than a spacing between ridges of the person's fingerprint.

10. The method of claim 1 wherein the touchscreen array comprises a capacitive wire grid.

11. A method for encoding information representative of a person's fingerprint comprising:
displaying a swipe path on a touchscreen array;
receiving two or more time-varying outputs from the touchscreen array as the person's finger follows the swipe path adjacent two or more elements of touchscreen array; and
digitizing the two or more outputs to generate two or more corresponding one-dimensional time-varying digital signals, each time varying digital signal comprising a sequence of digital amplitude values that are representative of a ridge and valley detail of a portion of the person's finger that passes adjacent a corresponding one of the two or more touchscreen array elements.

12. The method of claim 11 wherein the swipe path is represented as a moving object on a display portion of the touchscreen.

13. The method of claim 11 additionally comprising:
displaying at least one additional swipe path on the touchscreen array;
receiving additional time-varying outputs as a different finger of the person follows the additional swipe path; and
digitizing the additional time-varying outputs to generate two or more additional time varying digital signals, each additional time varying digital signal comprising a sequence of digital amplitude values that are representative of a ridge and valley detail of a rectangular portion of the different finger.

14. The method of claim 11 additionally comprising:
converting the sequence of digital amplitude values to a corresponding image representation comprising a single row of pixel values, where each pixel value corresponds to a gray scale conversion of a corresponding digital amplitude value.

15. The method of claim 11 additionally comprising:
determining whether there is a match between the detected time-varying digital signals and previously stored information that is representative of the person's fingerprint.

16. The method of claim 15 additionally comprising:
when the match is found, authorizing the person to use the touchscreen; and
when the match is not found, disabling use of the touchscreen.

17. The method of claim 11 additionally comprising:
detecting a touchscreen gesture from two or more of the time-varying digital signals, the touchscreen gesture used for a function other than fingerprint matching.

18. The method of claim 16 additionally comprising:
subsequent to when the match is found, repeatedly performing subsequent steps of determining whether there is a match between the detected time-varying digital signals and previously stored information that is representative of the person's fingerprint, to continuously authorize the person to use the touchscreen.

19. The method of claim 11 wherein a spacing between adjacent elements of the touchscreen array is at least ten times larger than a spacing between ridges of the person's fingerprint.

20. The method of claim 11 wherein the touchscreen array comprises a capacitive wire grid.

* * * * *